(12) United States Patent
Sonntag et al.

(10) Patent No.: US 12,092,247 B2
(45) Date of Patent: Sep. 17, 2024

(54) SUCTION-EXTRACTION ATTACHMENT

(71) Applicant: Robert Bosch GmbH, Stuttgart (DE)

(72) Inventors: Stefan Sonntag, Vogt (DE); Andreas Schurig, Lyss (CH); Christian Schaber, Bern (CH); Melanie Wassmer, Aarau (CH); Nikola Janjic, Bellach (CH); Xiao Qiu, Weingarten (DE); Achim Duesselberg, Kirchheim Unter Teck (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 17/363,454

(22) Filed: Jun. 30, 2021

(65) Prior Publication Data

US 2022/0003345 A1 Jan. 6, 2022

(30) Foreign Application Priority Data

Jul. 3, 2020 (DE) ...................... 10 2020 208 392.4

(51) Int. Cl.
*F16L 33/18* (2006.01)
*B23Q 11/00* (2006.01)

(52) U.S. Cl.
CPC .......... *F16L 33/18* (2013.01); *B23Q 11/0046* (2013.01); *B23Q 11/0071* (2013.01)

(58) Field of Classification Search
CPC ..... F16L 33/18; B23Q 11/046; B23Q 11/0071
See application file for complete search history.

(56) References Cited

U.S. PATENT DOCUMENTS

| 4,207,953 | A | * | 6/1980 | Reibetanz | .......... | B23Q 11/0046 |
| | | | | | | 173/218 |
| 4,472,855 | A | * | 9/1984 | Murphy | .................. | A47L 9/248 |
| | | | | | | 15/321 |
| 9,302,363 | B2 | * | 4/2016 | Ikuta | ........................ | B23B 47/34 |
| 9,440,344 | B2 | * | 9/2016 | Ikuta | ........................ | B25D 17/22 |
| 9,776,296 | B2 | * | 10/2017 | Brewster | ................ | B23Q 11/00 |
| 9,956,659 | B2 | * | 5/2018 | Takeuchi | ............ | B23Q 11/0046 |
| 10,328,541 | B2 | * | 6/2019 | Wong | ....................... | B25F 5/003 |
| 10,512,997 | B2 | * | 12/2019 | Yoshikane | .............. | B23B 47/34 |
| 10,857,644 | B2 | * | 12/2020 | Furusawa | .............. | B23B 45/003 |
| 2002/0084388 | A1 | * | 7/2002 | Geiger | ..................... | F16L 3/233 |
| | | | | | | 248/69 |

(Continued)

FOREIGN PATENT DOCUMENTS

CH 693 873 A5 3/2004
DE 41 17 496 A1 12/1992

(Continued)

*Primary Examiner* — Joshua G Kotis
*Assistant Examiner* — Scott A Howell
(74) *Attorney, Agent, or Firm* — Maginot, Moore & Beck LLP

(57) ABSTRACT

A fastening device for a suction hose includes a main body having a first fastening interface configured to fasten the main body to a handheld power tool and/or to an additional handle, in particular in a manner detachable without the use of tools. The main body further includes a second fastening interface configured to fasten the suction hose to the main body, in particular in a manner detachable without the use of tools. The fastening device also includes a joint unit configured to movably connect the suction hose to the handheld power tool and/or to the additional handle.

12 Claims, 16 Drawing Sheets

(56) References Cited

U.S. PATENT DOCUMENTS

| | | | |
|---|---|---|---|
| 2006/0042046 A1* | 3/2006 | Decker | B25G 1/102 16/430 |
| 2010/0096511 A1* | 4/2010 | Olver | H02G 3/32 248/65 |
| 2010/0186188 A1* | 7/2010 | Williams | A47L 5/24 15/344 |
| 2013/0206440 A1* | 8/2013 | Ikuta | B23Q 11/0071 173/198 |
| 2013/0213681 A1* | 8/2013 | Ikuta | B23Q 41/00 173/75 |
| 2013/0213683 A1* | 8/2013 | Brewster | B25F 5/026 173/198 |
| 2014/0138114 A1* | 5/2014 | Takeuchi | B23Q 11/0071 173/198 |
| 2019/0160622 A1* | 5/2019 | Barth | B24B 55/10 |

FOREIGN PATENT DOCUMENTS

| | | |
|---|---|---|
| DE | 92 13 562 U1 | 3/1993 |
| DE | 198 60 182 A1 | 7/2000 |
| DE | 10 2004 036 643 A1 | 4/2006 |
| DE | 20 2006 010 017 U1 | 10/2006 |
| DE | 10 2014 212 398 A1 | 12/2015 |
| DE | 10 2017 219 449 A1 | 5/2019 |
| EP | 2 591 886 A1 | 5/2013 |

\* cited by examiner

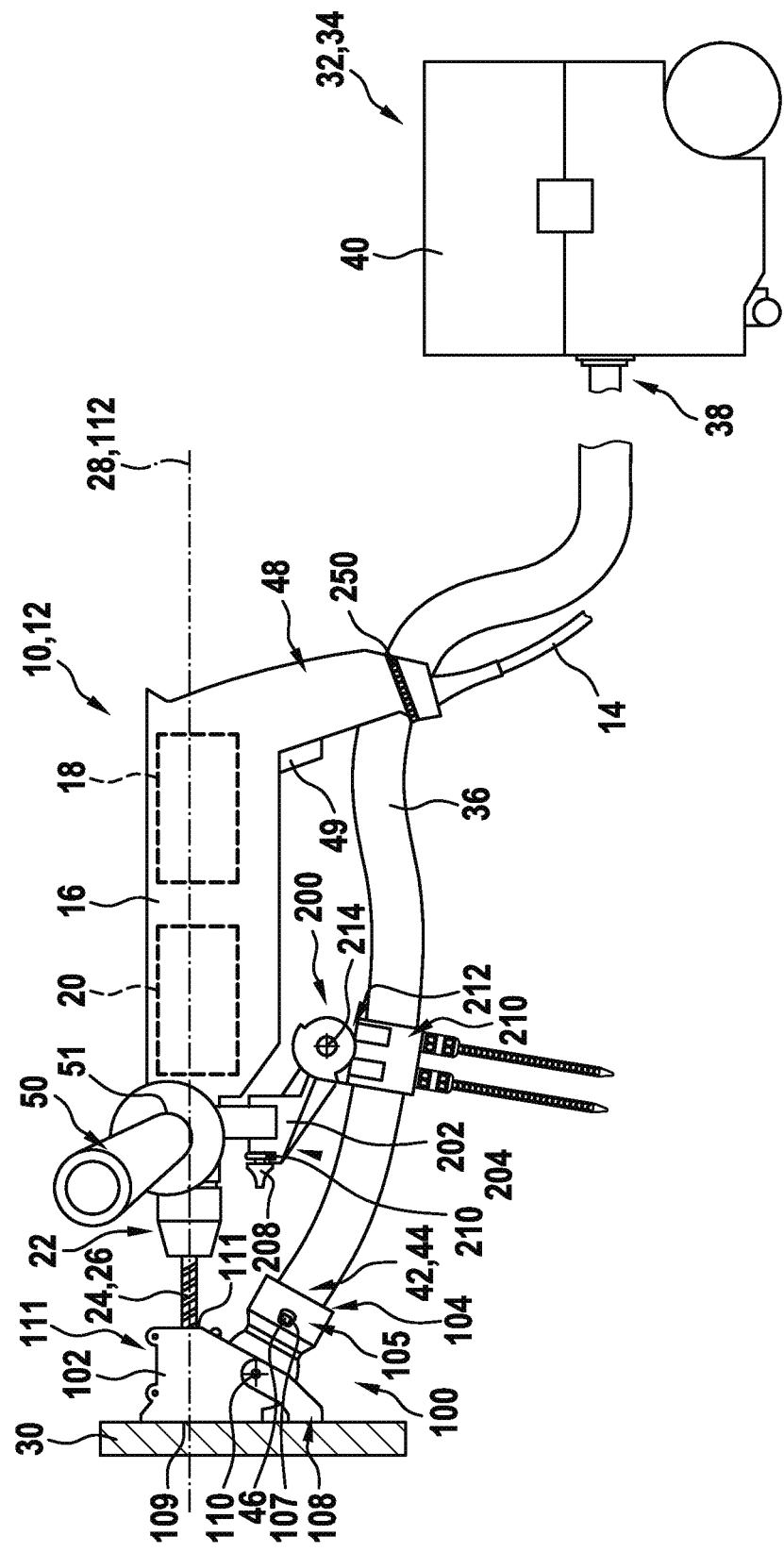

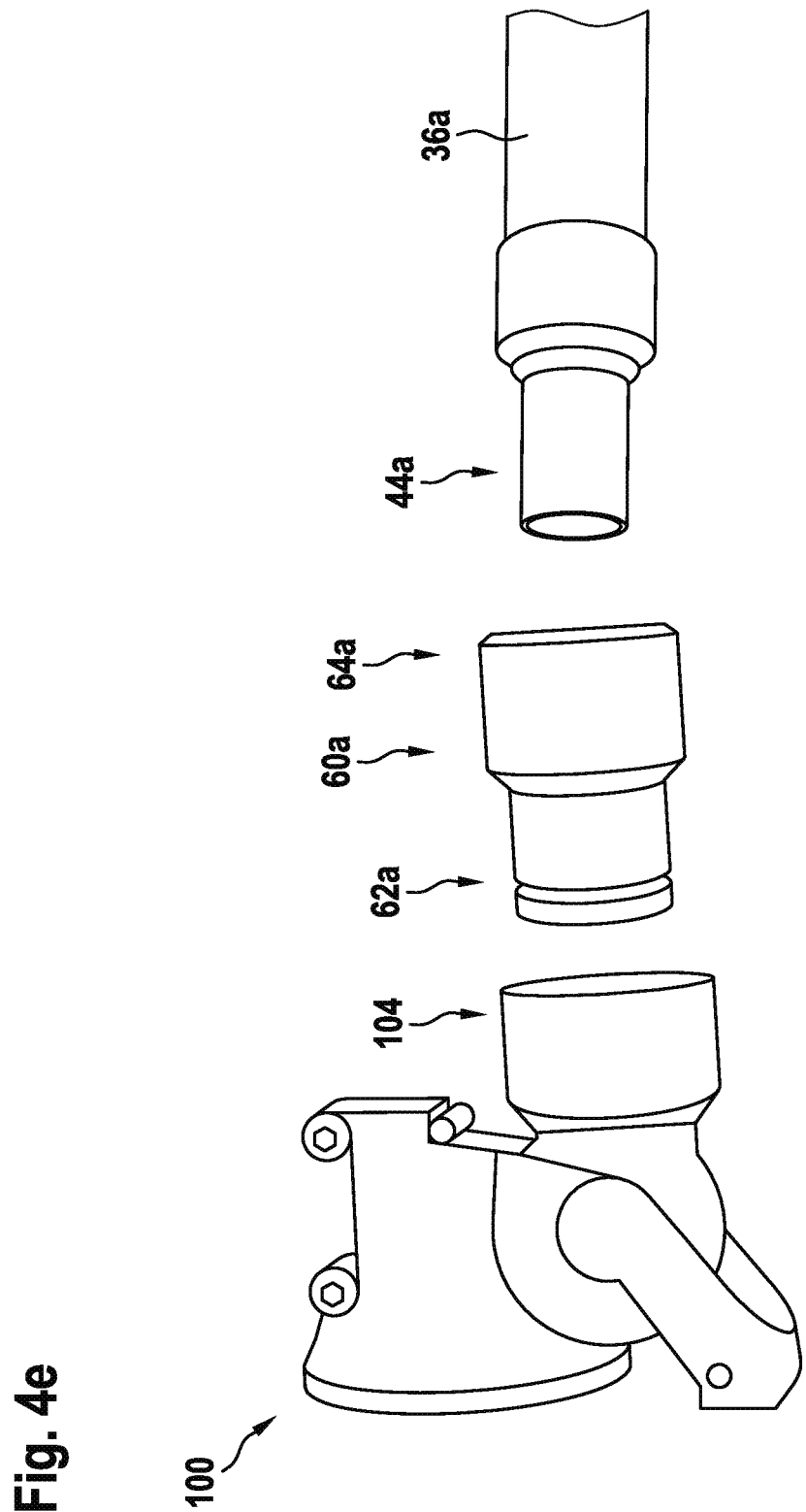

SUCTION-EXTRACTION ATTACHMENT

This application claims priority under 35 U.S.C. § 119 to patent application no. DE 10 2020 208 392.4, filed on Jul. 3, 2020 in Germany, the disclosure of which is incorporated herein by reference in its entirety.

BACKGROUND

DE 10 2017 219 449 A1 has described a suction-extraction attachment for an application tool.

SUMMARY

The disclosure relates in particular to a suction-extraction aid for a handheld power tool, having a housing, having a receptacle for an application tool, and having an interface for the connection of the suction-extraction aid to a suction-extraction device, in particular to an end of a suction hose of the suction-extraction device. It is proposed that the interface has a joint unit which is configured to connect the interface movably to the housing. It is advantageously thus possible to realize improved ergonomics of the overall system composed of suction-extraction aid, handheld power tool and suction-extraction device.

The suction-extraction aid is configured such that drilling cuttings or dust is extracted by suction directly at the location of use of the application tool. In particular, the suction-extraction aid is provided substantially merely for conducting the air stream of the suction-extraction device. The suction-extraction aid preferably has no dust-collecting chamber, no filter unit and no blower unit. The suction-extraction aid is configured to be detachably connectable, in particular connectable in axially movable fashion, to the application tool. The suction-extraction aid has a dust-receiving opening via which the dust enters the suction-extraction aid, in particular enters the housing of the suction-extraction aid. The dust-receiving opening is arranged at a workpiece side.

A handheld power tool is to be understood in particular to mean a power tool which is held by hand, or guided by hand, during operation. The handheld power tool may for example be configured as a mains-powered appliance. It is likewise conceivable for the handheld power tool to be configured as a battery-operated handheld power tool, wherein the battery-operated handheld power tool preferably has a battery interface by means of which it is detachably connected to a handheld power tool battery pack. In the context of this application, a detachable connection is to be understood in particular to mean a connection that is detachable without the use of tools. The handheld power tool battery pack is preferably configured to be exchangeable. The handheld power tool is in particular configured for generating a drilled hole in a workpiece or for the removal of material from a workpiece. The handheld power tool may for example be configured as a power drill, as a drill driver, as a rotary percussive drill, as a hammer drill, as a demolition hammer or the like. The handheld power tool comprises a drive unit, which has in particular an electric motor. The drive unit is preferably, by means of a transmission unit with the tool receptacle, configured for transmitting a drive movement. The tool receptacle is provided for the detachable connection of the application tool to the tool receptacle. The application tool received in the tool receptacle is configured such that it can be driven in rotation about, and/or in linearly oscillating fashion along, a working axis of the handheld power tool.

The suction-extraction device is configured in particular for the extraction of drilling cuttings or drilling dust by suction during the drilling process, or out of a drilled hole. The suction-extraction device is configured in particular as a vacuum cleaner or as an industrial vacuum cleaner. The suction-extraction device has, in particular, a preferably detachable suction hose. The air stream generated by the suction-extraction device is conducted by means of the suction-extraction aid to the working location of the application tool. The suction-extraction device comprises a blower unit which comprises a fan element. The fan element may be configured for example as an axial fan, as a radial fan, as a diagonal fan or as a tangential fan. The suction-extraction device furthermore comprises a dust-collecting chamber which is configured to receive the dust or drilling cuttings. The suction-extraction device furthermore comprises a filter unit, which preferably has a HEPA filter. The suction-extraction device preferably furthermore comprises a filter cleaning unit which be configured for cleaning the filter unit. The filter cleaning unit may for example be implemented by means of a thrust reversal, in the case of which the flow direction of the air stream within the suction-extraction device is reversed in order to clean the filter unit by way of an air flow. It would alternatively likewise be conceivable for the filter cleaning unit to act mechanically, for example by ultrasound filter cleaning.

The application tool may for example be configured as a drilling tool, in particular as a rock, wood or metal drill bit, as a chisel etc. The application tool is configured in particular as a drilling tool that is provided for a hammer drill or a percussive drilling tool. The application tool has, along a longitudinal axis, an insertion end, a shank region and a drilling tip. At its end averted from the drilling tip, the application tool has the insertion end which is configured for coupling to the handheld power tool. The application tool is preferably configured in the region of the insertion end such that the application tool can be coupled to a tool receptacle of the handheld power tool. For example, the application tool may, in the region of the insertion end, have positive-locking elements which are configured as special grooves and which form, for example, an SDS plus interface, a hex interface, a cylinder shank or an SDS max interface. For the machining of a workpiece, the application tool is set into a rotating and/or linearly oscillating or percussive state by means of the handheld power tool. During the machining, the drilling tool penetrates into the workpiece in a feed direction of the drilling tool. The longitudinal axis of the drilling tool corresponds in particular to a working axis and/or axis of rotation of the drilling tool. In this context, a drilling tip is to be understood in particular to mean a region of the drilling tool which has at least one cutting body. The cutting body has at least one cutting element. The at least one cutting element may be formed from a hard metal. It is likewise conceivable for the cutting elements to be formed from steel, in particular HSS.

The housing of the suction-extraction aid is preferably of multi-part form. The housing may be formed from a metallic material and/or from a plastic. The plastic may be formed from a soft plastic and/or a hard plastic. The receptacle of the housing of the suction-extraction aid may be formed as a single piece or integrally with the housing of the suction-extraction aid. In the context of this application, "as a single piece" is to be understood to mean two components or elements which are manufactured from one piece, that is to say are not connected to one another by means of a non-positively and/or positively locking or cohesive connection. In the context of this application, "integrally" is to be understood to mean at least two components that are cohesively connected to one another. The receptacle is in particular configured to secure the suction-extraction aid against falling off in the state in which said suction-extraction aid is connected to the application tool. The receptacle extends between two openings, via which the application tool can preferably be received. In the connected state, the receptacle has an opening arranged at a workpiece side and an opening arranged at a handheld power tool side. The openings have in particular a diameter larger than a diameter of the application tool, in particular than a diameter of the drilling tip of the application tool. The receptacle has an outer surface which faces toward the application tool. The outer surface of the receptacle may be formed from a plastic or preferably at least partially from a metallic material. The receptacle at least regionally substantially completely surrounds the application tool in the connected state.

The interface for the connection of the suction-extraction aid to the suction-extraction device is provided for a connection which is detachable in particular without the use of tools. The connection may for example be realized by means of a non-positively and/or positively locking connection. For example, the interface may be configured as a cylindrical or conical connecting piece, wherein the end of the suction hose is likewise of conical or cylindrical form in order to generate non-positive locking. Alternatively or in addition, the interface may have at least one detent element for producing a detent connection. It is likewise conceivable for the interface to be configured as a bayonet fastener.

The joint unit has at least two joint elements which are configured to be movable relative to one another. The joint element is preferably configured integrally or as a single piece with the housing and/or with the interface. The joint unit may for example be configured as a ball joint, as a condyloid joint, as a saddle joint, as a hinge joint or as a pivot joint.

It is furthermore proposed that the interface be configured to be movable such that the interface has exactly one first rotational degree of freedom. The first rotational degree of freedom is in particular configured such that the interface is configured to be rotatable about an axis which extends in a skewed and perpendicular manner with respect to a receiving axis of the receptacle. The receiving axis runs coaxially with respect to the longitudinal axis of the application tool to be received. In particular, the rotational degree of freedom is configured such that the interface is movable on a preferably shortest path in the direction of the receiving axis or in the direction of the application tool.

It is furthermore proposed that the interface be configured to be movable such that the interface has at least two rotational degrees of freedom. It is advantageously possible in this way for the mobility of the interface to be further improved. The rotational degrees of freedom are arranged perpendicular to one another. The second rotational degree of freedom is in particular configured so as to preferably perpendicularly cross the receiving axis.

It is furthermore proposed that the joint unit be configured such that the interface is pivotable in an angle range of at least 45°, preferably at least 90°, preferably at least 120°. It is advantageously thus possible for the ergonomics to be further improved. The angle range is preferably configured along the first rotational degree of freedom.

It is furthermore proposed that a connecting axis along which the suction-extraction device, in particular the suction hose of the suction-extraction device, is connectable to the suction-extraction aid, is, in at least one state, configured so as to be substantially parallel to a receiving axis along which the receptacle of the housing of the suction-extraction aid extends. It is advantageously possible in this way for the suction-extraction aid to be optimized in terms of flow. The connection may be realized exclusively by means of a linear movement along the connecting axis or partially by means of a linear movement along the connecting axis. The connecting axis is preferably, in at least one state, configured so as to be substantially perpendicular to the receiving axis.

It is furthermore proposed that the receptacle has a receiving element and a spring element, wherein the spring element acts on the receiving element with a force. It is advantageously thus possible for tilting of the suction-extraction aid on the application tool to be prevented, whereby the suction-extraction performance is increased. The receiving element partially delimits the receiving region that is spanned by the receptacle. The receiving element may be formed from a metallic material or from a plastic. The receiving element is mounted movably in the housing of the suction-extraction aid. The receiving element is preferably mounted linearly movably in the housing. The receiving element may have a guide element, for example a guide peg, which is provided for guiding the linear movement. The receiving element preferably has a single translational and/or a single rotational degree of freedom.

In the context of this application, a spring element is to be understood in particular to mean a component in that is elastically deformable and which is preferably composed of a metal. It would however also be conceivable for the spring element to be composed of a plastic, in particular a hard plastic. The spring element may for example be configured as a flexural spring, in particular a leaf spring or a wire spring. It is alternatively also conceivable for the spring element to be configured as a torsion spring, in particular a rod spring or a helical spring. Other configurations are also conceivable, for example a disk spring, an evolute spring, an annular spring, an air or gas spring, or the like. Alternatively or in addition, it is likewise conceivable for the receiving element to be mounted pivotably in the housing of the suction-extraction aid. It is alternatively also conceivable for the receiving element to be composed of a tube element, for example of a metal tube.

The receptacle preferably has at least one actuating element by means of which the receiving region can be enlarged. It is advantageously possible in this way for the connection of the suction-extraction aid to the application tool to be simplified. The actuating element is preferably mechanically coupled to the receiving element such that a movement of the actuating element results in a movement of the receiving element. The actuating element is preferably formed as a single piece or integrally with the receiving element. The actuating element is configured in particular for manual actuation by a user.

It is furthermore proposed that the receiving element is configured to be optimized in terms of flow such that the receiving element partially or entirely delimits an air channel which is configured so as to be spaced apart from the receptacle. It is advantageously thus possible, for example, for a leakage air channel to be provided. The air channel is in particular configured such that the air channel is larger in the state in which it is not connected to the application tool than in the state in which it is connected to the application tool. The air channel is in particular arranged on a side of the receiving element which is averted from the application tool.

It is furthermore proposed that the housing has a first air channel for the drawing-in of fresh air and a second air channel for the extraction of the drilling cuttings by suction, wherein the housing forms a connecting region which is configured for connecting the two air channels in terms of flow when the suction-extraction aid is in the state in which it lies against the tool. The air channels may extend in substantially rectilinearly or else curved fashion. The suction-extraction aid preferably has at least two first air channels, wherein one of the first air channels is formed by the receptacle. It is likewise conceivable for one of the first air channels to run spaced apart from the receptacle and parallel to the receptacle. In particular, at least one of the first air channels runs in a curved manner, or along a circular path, around the receiving axis.

It is furthermore proposed that the housing has a support element which is configured for enlarging the contact surface of the suction-extraction aid. It is advantageously thus possible for tilting of the suction-extraction aid on the workpiece to be minimized. The housing of the suction-extraction aid has a contact surface that limits the connecting region. Preferably, the support element is arranged spaced apart from the contact surface. In particular, the spacing between the support element and the contact surface is greater than 10% of the diameter of the contact surface, preferably greater than 25% of the diameter of the contact surface, preferably greater than the diameter of the contact surface. The support element is preferably formed integrally or as a single piece with the housing. The support element has a support contact surface which has a diameter which corresponds to at least 25% of the diameter of the contact surface, preferably at least 50% of the diameter of the contact surface.

It is furthermore proposed that the suction-extraction aid has an air-guiding element in the connecting region, wherein the air-guiding element is configured to reduce the size of that region on the wall which is impinged on by dust-laden air. The suction-extraction efficiency is thus advantageously further improved. In particular, the air-guiding element is configured such that that area on the wall which comes into contact with dust-laden air during operation is smaller than 75% of the region spanned by the contact surface, preferably smaller than 50% of the region spanned by the contact surface, preferably smaller than 25% of the region spanned by the contact surface. The air-guiding element is preferably configured integrally or as a single piece with the housing of the suction-extraction aid.

The disclosure furthermore relates to a fastening device for a suction-extraction hose, having a main body, having a first fastening interface for the fastening of the main body to a handheld power tool and/or to an additional handle in particular in a manner detachable without the use of tools, and having a second fastening interface for the fastening of the suction hose to the main body in particular in a manner detachable without the use of tools. It is proposed that the fastening device has a joint unit for the movable connection of the suction hose to the handheld power tool and/or to the additional handle.

The fastening device is configured for the connection of the suction hose to the handheld power tool or to the additional handle in particular in a manner detachable without the use of tools. An additional handle is to be understood in particular to mean a handle which is connectable to a housing of the handheld power tool without the use of tools and which is preferably used in the case of heavy handheld power tools such as hammer drills or angle grinders. The fastening device may have one or more joint units. Preferably, the fastening device has at least two joint units, wherein one joint unit is assigned to the first fastening interface and the other joint unit is assigned to the second fastening interface.

The main body of the fastening device may be formed from a plastic or a metallic material. The first and the second fastening interface may be formed partially as a single piece with the main body. The joint unit of the fastening device may be configured to fasten the main body in a relatively movable manner to the handheld power tool and/or to the additional handle. It is alternatively conceivable for the joint unit to be formed so as to fasten the second fastening interface in an at least partially relatively movable manner to the main body.

It is furthermore proposed that the joint unit has a resetting element. It is advantageously thus possible to realize improved operability of the fastening device. The resetting element may be configured in particular as a spring element. The resetting element may be arranged in or on the main body of the fastening device. In particular, the resetting element is configured to exert a force on a joint element of the joint unit. Preferably, the resetting element is arranged between two joint elements. Preferably, the resetting element lies directly against at least one, preferably against at least two, joint elements of the joint unit.

It is furthermore proposed that the first fastening interface has at least two positioning elements, wherein the positioning elements are configured for the non-positively and/or positively locking connection of the fastening device to the handheld power tool and/or to the additional handle, wherein the handheld power tool and/or the additional handle has a spacing to the second fastening interface and/or to the suction-extraction aid which is greater in the state in which said handheld power tool and/or additional handle is connected to the first positioning element than in the state in which said handheld power tool and/or additional handle is connected to the second positioning element. It is advantageously thus possible for the system composed of the fastening device and the suction-extraction aid to be optimally adapted to different lengths of application tools. The positioning elements are preferably of substantially identical form. The positioning elements may be arranged in a row or so as to be offset with respect to one another.

It is furthermore proposed that the second fastening interface has at least one first fastening element which is configured to, in the fastened state, lie against the suction hose or partially engage around the suction hose. The first fastening element is preferably of rigid form. The first fastening element may for example be formed from a plastic, in particular from a hard plastic. The first fastening element may be adapted, on a side facing toward the suction hose, to the size and/or contour of the suction hose. The adaptation may for example be configured in the form of webs which run in a circumferential direction and which engage into channels of the suction hose.

It is furthermore proposed that the second fastening interface has at least one second fastening element which is configured to be movable relative to the first fastening element. It is advantageously thus possible to realize a flexible fastening of suction hoses of different size. The second fastening element is in particular of elastic and/or easily bendable configuration. The second fastening element may be detachably connected to the first fastening element. The second fastening element is preferably formed from an elastic plastic, in particular a soft plastic. In particular, the first fastening element has at least one guide element which is configured for guiding the second fastening element. The guide element may for example be configured as a recess or a passage in the first fastening element. Preferably, the second fastening element has at least two connecting means which correspond to one another and by means of which the second fastening element is connectable to itself in non-positively and/or positively locking fashion. The second fastening element is preferably configured as a cable tie element. The cable tie element is preferably configured as a reusable cable tie element.

It is furthermore proposed that the second fastening interface is connectable partially or entirely detachably to the main body. It is advantageously thus possible to realize a faster detachment from and reconnection to the suction hose. In particular, the first and the second fastening element are connected to the main body in a manner detachable without the use of tools. In particular, the first fastening element has, on a side averted from the suction hose, a connecting element for connection to the main body. The connecting element may be configured as a non-positive and/or positive locking element, in particular as a detent element.

The disclosure furthermore relates to a system comprising an above-described suction-extraction aid with a joint unit and an above-described fastening device with a joint unit. It is advantageously thus possible to realize an optimum connection of the suction hose to the handheld power tool. In particular, the suction-extraction aid has a joint axis which is configured substantially parallel to a joint axis of the fastening device. During the machining of a workpiece, the application tool penetrates into the workpiece, and the suction-extraction aid is displaced rearward relative to the drilling tip of the application tool, and in this way, the spacing between the suction-extraction aid and the fastening device is shortened. The joint unit are preferably oriented such that, during a movement of the suction-extraction aid in the direction of the fastening device, the two joint units rotate in opposite directions.

It is furthermore proposed that the system has a further fastening means for the connection of a suction hose to a handheld power tool. It is advantageously thus possible for the connection to be further improved. The further fastening means may be configured for example as a cable tie element.

It is furthermore proposed that the joint unit of the suction-extraction aid and/or the joint unit of the fastening device comprise a resetting element which is configured such that the suction-extraction aid, in the state in which it is connected to the fastening device via a suction hose, is acted on with a force that is directed oppositely to the fastening device. In particular, the force is directed partially or entirely along the feed direction of the application tool.

The disclosure furthermore relates in particular to a system comprising a suction-extraction aid and a fastening device for a handheld power tool, having a decoupled outer housing, having a first fastening interface for the fastening of the fastening device to the handheld power tool, and having a second fastening interface for the fastening of the suction hose to the fastening device. It is proposed that the fastening device has a boosting unit, in particular a joint unit, which is configured for transmitting a relative movement of the decoupled outer housing in boosted fashion to the second fastening interface. It is advantageously thus possible for the suction extraction to be optimized. Other configuration of the boosting unit are also conceivable, for example a cable pull, or by means of toothed gear fragments. In the context of this application, a decoupled outer housing is to be understood in particular to mean an outer housing part which is connected to a further outer housing part, or to an inner housing part, via a damping unit for reducing vibrations. When the handheld power tool is applied to the workpiece, the decoupled outer housing is subject to a relative movement with respect to the tool receptacle and/or the further outer housing part or the inner housing part, which must be compensated in order to attain optimum positioning of the suction-extraction aid. In particular, the joint unit is assigned to the first fastening interface. The boosting unit is in particular configured to transmit a relative movement of the outer housing parts in one direction in boosted fashion to the second fastening interface, such that a movement of the second fastening interface is at least doubled, preferably at least tripled, preferably in the same direction. In particular, the boosting unit is configured such that, in the event of a decrease of the spacing between the decoupled outer housing and the tool receptacle, a spacing between the tool receptacle and the suction-extraction aid is increased, wherein a magnitude of the increase along the working axis is greater than a magnitude of the decrease along the working axis. It is advantageously thus possible to achieve that, when an application tool, in particular a chisel, is applied, the view-impairing suction-extraction aid is sufficiently retracted, and during the dust-generating chiseling process, the suction-extraction aid is as close as possible to the workpiece surface that is to be machined.

It is furthermore proposed that the first fastening interface and the second fastening interface are configured as a lever. It is advantageously thus possible for a travel boosting action to be realized. The lever is configured in particular as a unilateral lever, in the case of which a center of rotation is arranged only on one side. It would alternatively likewise be conceivable for the lever to be configured as a bilateral lever with at least two centers of rotation or axes of rotation. It would likewise be conceivable for the lever to be configured as an angled lever. In particular, the second fastening interface is of substantially rigid configuration. The first fastening interface preferably comprises an axis of rotation about which the second fastening interface is rotatable. The axis of rotation is preferably configured in a skewed and perpendicular manner with respect to a working axis of the handheld power tool. The axis of rotation is preferably configured so as to be movable relative to the second fastening interface.

It is furthermore proposed that the joint unit has two joint elements, wherein a first joint element is fastened to a first housing part of the handheld power tool and a second joint element is fastened to a second housing part of the handheld power tool. The fastening may in each case be configured so as to be detachable without the use of tools or not detachable without the use of tools. The first housing part and the second housing part are in particular configured as outer housing parts. The joint elements are preferably connected fixedly or detachably to the first and/or the second housing part of the handheld power tool.

The disclosure furthermore relates in particular to a handheld power tool having a housing, having a first housing part and having a second housing part, wherein at least the second housing part is configured as an outer housing part which is decoupled from the first housing part, and having a fastening device for a suction hose, wherein the fastening device has a first fastening interface for the fastening of the fastening device to the handheld power tool and a second fastening interface for the fastening of the suction hose to the fastening device. It is proposed that the fastening device has a boosting unit, in particular a joint unit, which is configured for transmitting a relative movement of the housing parts with respect to one another in boosted fashion to the second fastening interface. It is advantageously thus possible to realize optimum suction-extraction performance. The handheld power tool is configured in particular as a demolition hammer.

BRIEF DESCRIPTION OF THE DRAWINGS

Further advantages will emerge from the following description of the drawings. The drawings, the description and the claims contain numerous features in combination. A person skilled in the art will expediently also consider the features individually and combine them to form meaningful further combinations. Reference designations of features of different embodiments of the disclosure which substantially correspond will be denoted by the same numeral and by an alphabetic character which characterizes the embodiment.

In the drawings:

FIG. 1b shows a side view of the suction-extraction aid and of the fastening device in the state in which they are fastened to the handheld power tool, as per FIG. 1a, during the drilling process;

FIG. 2a shows a longitudinal section of the suction-extraction aid as per FIG. 1a;

FIG. 2d shows a perspective view of the suction-extraction aid as per FIG. 1a;

FIG. 3a shows a side view of the fastening device as per FIG. 1a;

FIG. 3d shows a perspective view of a second fastening interface of the fastening device as per FIG. 3a;

FIG. 4b shows a further perspective view of the fastening device as per FIG. 4a;

FIG. 4c shows a perspective view of a main body of the fastening device as per FIG. 4a;

FIG. 4d shows a side view of a fastening element of the fastening device as per FIG. 4a;

FIG. 4e shows a side view of a suction-extraction aid, of an adapter for a suction hose, and of the suction hose;

DETAILED DESCRIPTION

Figure 1A:
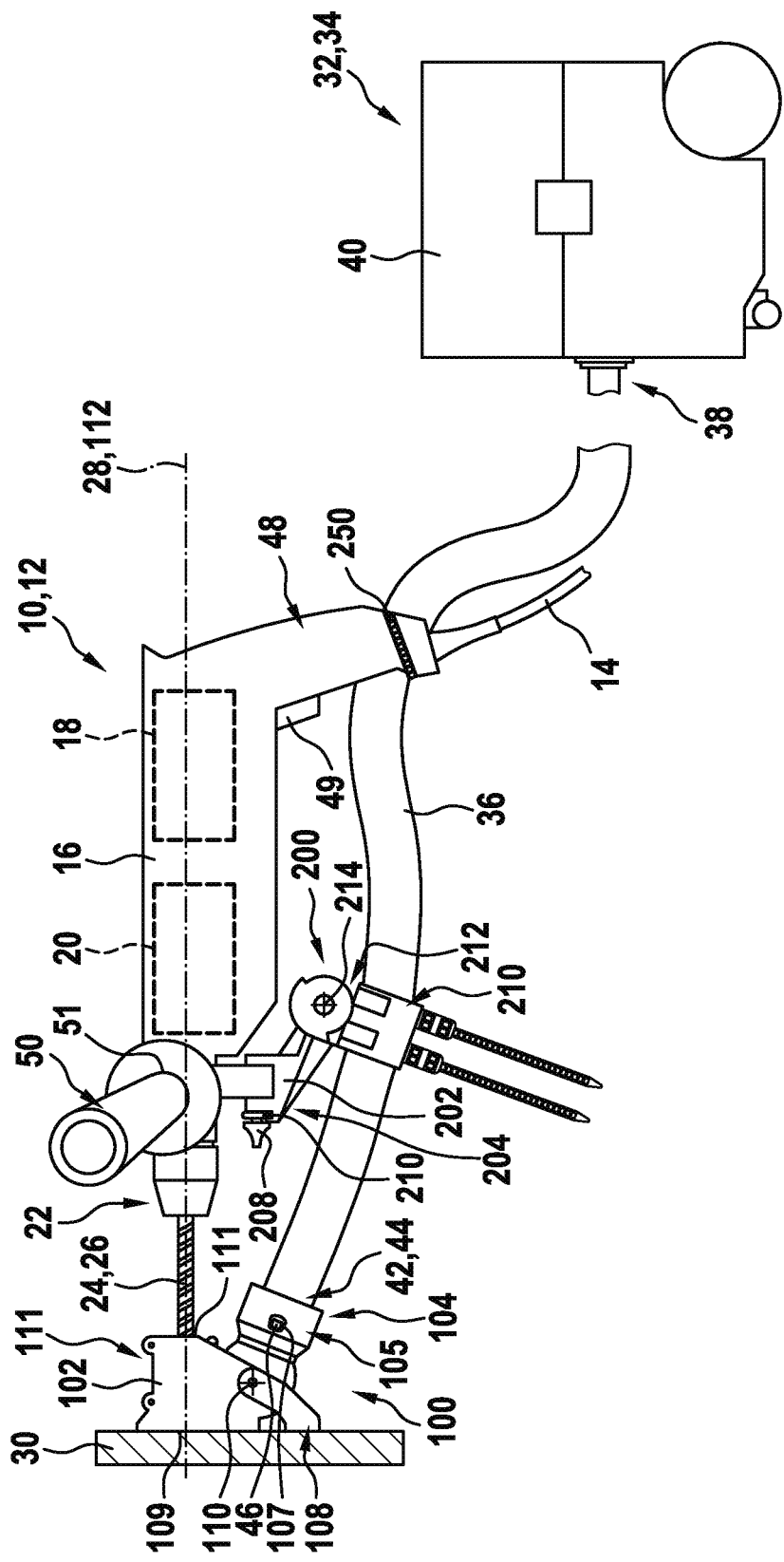
FIG. 1a shows a side view of a suction-extraction aid and of a fastening device in the state in which they are fastened to a handheld power tool.

FIGS. 1a and 1b show a handheld power tool 10, which is connected to suction-extraction aid 100 and a fastening device 200, in a side view.

The handheld power tool 10 is for example configured as a hammer drill 12. The handheld power tool 10 is configured for example as a mains-powered handheld power tool 10, which is connectable to a power source, such as an electrical mains grid, by means of a mains cable 14. The handheld power tool 10 has a housing 16 which is configured as an outer housing and in which there is arranged a drive unit 18 which comprises an electric motor and which is connected via a transmission unit 20 to a tool receptacle 22, which transmission unit comprises a pneumatic percussive mechanism. The tool receptacle 22 is configured for receiving, in particular in non-positively and/or positively locking fashion, an application tool 24. The application tool 24 received in the tool receptacle 22 is configured for example as a rock drill bit 26. The rock drill bit has, at one end, an insertion end which is configured for example as an SDS plus insertion end. At an end situated opposite the SDS plus insertion end, the rock drill bit 26 has a drilling tip, which has a cutting body composed of a hard metal. The tool receptacle 22 of the handheld power tool 10 is, correspondingly to the rock drill bit 26, configured for example as an SDS plus tool receptacle. The tool receptacle 22 is coupled to the drive unit 18 such that a drive movement of the drive unit 18 can be transmitted to the application tool 24. The application tool 24 is configured such that it can be driven in rotation around, and in linearly oscillating fashion along, a working axis 28 of the handheld power tool 10.

The housing 16 of the handheld power tool 10 has a handle 48 which extends substantially perpendicular to the working axis 28 of the handheld power tool 10. Arranged on the handle 48 is an operating switch 49 for switching the handheld power tool 10 on and off. The handle 48 is configured for holding and guiding the handheld power tool 10. Owing to the weight and the vibrations that occur during operation, the handheld power tool 10 has an additional handle 50, by means of which advantageous two-handed use is made possible. The additional handle 50 is connected to the housing 16 of the handheld power tool 10 in a manner detachable without the use of tools. The additional handle 50 is connectable to the handheld power tool 10 in different positions in the region of the tool receptacle 22. In FIGS. 1a and 1b, the additional handle 50 has been connected so as to extend substantially perpendicular to the working axis 28 and perpendicular to the handle 48.

During the operation of the handheld power tool 10, this lies with the application tool 24, in particular with the drilling tip of the application tool 24, against a workpiece 30. As a result of the rotation and percussive movement of the rock drill bit 26, a drilled hole is generated by partial removal of material of the workpiece 30, wherein drilling cuttings and dust are generated at the working location. The drilling cuttings that are generated can advantageously be directly picked up, and extracted by suction, via the suction-extraction aid 100.

The suction-extraction aid 100 has a housing 102. The suction-extraction aid 100 has an interface 104 which is configured for connecting the suction-extraction aid 100 to a suction-extraction device 32.

The suction-extraction device 32 is configured for example as an industrial vacuum cleaner 34. The suction-extraction device 32 has a weight which is so high that a direct attachment of the suction-extraction device to the handheld power tool 10 is not possible. The suction-extraction device has a suction hose 36. At a first end 38, the suction hose 36 is detachably connected to a housing 40 of the suction-extraction device 32. Arranged in the housing 40 of the suction-extraction device 32 is a drive unit which is configured for driving a blower unit. The blower unit is configured for generating a negative pressure for the purposes of generating an air stream. Furthermore, in the housing, there is preferably arranged a dust-collecting chamber, which comprises a filter unit and which is provided for receiving the drilling cuttings or dust. At an end 42 situated opposite the first end 38, the suction hose 36 has a coupling interface 44.

The interface 104 of the suction-extraction aid 100 has a substantially cylindrical suction hose receptacle 105, which is configured for the connection of the suction hose 36 of the suction-extraction device 32. The suction hose receptacle 105 has a non-positive locking element 106 in the form of a substantially cylindrically shaped inner surface. Furthermore, the suction hose receptacle 105 has a positive-locking element 107 in the form of a recess in the cylindrical wall. The coupling interface 44 of the suction hose 36 comprises corresponding non-positive and/or positive locking elements for the non-positively and/or positively locking connection of the suction hose 36 to the suction-extraction aid 100, in particular to the interface 104 of the suction-extraction aid 100. The coupling interface 44 of the suction hose 36 is received in the suction hose receptacle 105 of the suction-extraction aid and held in non-positively locking fashion in the substantially cylindrically shaped inner side. Furthermore, the coupling interface 44 has, on the outer side, a resilient detent element 46 which, in the connected state, engages into the positive-locking element 107, configured as a cutout, of the suction hose receptacle 105 and thus secures the suction hose 36 against rotation and axially.

The suction-extraction aid 100, in particular the housing 102 of the suction-extraction aid 100, comprises a receptacle 111 for receiving the application tool 24. The receptacle 111 has a first opening 109 and a second opening 113, through which the application tool 24 can be pushed through the housing 102 of the suction-extraction aid 100. Here, the connection occurs for example along a receiving axis 112 which extends between the openings 109, 110. In the connected state, the receiving axis 112 is configured substantially coaxially with respect to the working axis 28 of the handheld power tool 10. Between the two openings 109, 113, the receptacle 111 is for example of substantially closed form. In the state in which it is connected to the application tool 24, the suction-extraction aid 100 is secured radially against falling by the application tool 24.

The interface 104 of the suction-extraction aid 100 furthermore comprises a joint unit 108 which is configured for connecting the interface 104, in particular the interface 104 and the suction hose 36, movably to the housing 102. The joint unit 108 is configured such that the interface 104 is pivotable with the suction hose 36 about an axis of rotation 110. The axis of rotation 110 is configured in a perpendicular and skewed manner with respect to the receiving axis 112 of the suction-extraction aid 100 and/or the working axis 28 of the handheld power tool 10. The joint unit 108 is configured such that the interface 104 is movable in an angle range of approximately 90°. In particular, the interface 104 is configured such that the mobility of the interface 104 is delimited in one direction by the handheld power tool 10 or the application tool 24 and in the opposite direction by the workpiece 30.

The fastening device 200 is configured for the fastening of the suction hose 36 to the handheld power tool 10. In particular, the fastening device 200 is configured for the fastening of the suction hose 36 to the additional handle 50 of the handheld power tool 10.

The fastening device 200 comprises a main body 202 which is connected by means of a first fastening interface 204 to the additional handle 50 of the handheld power tool 10. The first fastening interface 204 comprises a fastening means or fastening structure 206, configured to be detachably connectable to the main body 202.

The additional handle 50 has a passage opening for receiving a depth stop (not illustrated). The fastening means 206 is of substantially cylindrical configuration with an outer diameter that substantially corresponds to the diameter of the passage opening of the additional handle 50. For the connection of the fastening device 200 to the additional handle 50, the fastening means 206 is led through the passage opening and held axially by means of a securing element 208. The first fastening interface 204 is thus, for example, configured for the rigid and detachable fastening of the fastening device 200 to the handheld power tool 10 or to the additional handle 50.

Furthermore, the fastening device 200 comprises a second fastening interface 210 for the fastening of the suction hose 36 to the main body 202, and a joint unit 212 for the movable connection of suction hose 36 to the handheld power tool 10 and the additional handle 50. The second fastening interface 210 or the suction hose 36 is, by means of the joint unit 212, configured so as to be rotatable about an axis of rotation 214. The axis of rotation 214 is, for example, configured in a substantially skewed and perpendicular manner with respect to the working axis 28 of the handheld power tool 10. Preferably, the axis of rotation 214 of the joint unit 212 of the fastening device 200 can be arranged substantially parallel to the axis of rotation 110 of the joint unit 108 of the suction-extraction aid 100, wherein, in the exemplary embodiment shown, the position of the axis of rotation 214 of the fastening device 200 is dependent on the positioning of the additional handle 50 on the handheld power tool 10.

FIG. 1b shows a side view of the suction-extraction aid 100 and of the fastening device 200 in the state in which they are fastened to the handheld power tool 10, as per FIG. 1a, during the drilling process. The application tool 24 has penetrated partially into the workpiece 30, and the suction-extraction aid 100 is being displaced axially on the application tool 24 toward the workpiece 30 on the application tool 24 in the direction of the handheld power tool 10 and thus in the direction of the fastening device 200 connected to the handheld power tool 10. In order that this movement is as smooth as possible, the suction hose 36 is pivoted, in order to be relieved of load, by means of the joint unit 108 of the suction-extraction aid 100 and by means of the joint unit 212 of the fastening device 200. In the side view shown, the suction hose 36 is, in the region of the suction-extraction aid 100, rotated clockwise about the axis of rotation 110 of the joint unit 108 of the suction-extraction aid 100 and, in the region of the fastening device 200, rotated counterclockwise about the axis of rotation 214 of the joint unit 212 of the fastening device 200. The rotations about the axis of rotation 110 of the joint unit 108 of the suction-extraction aid 100 and about the axis of rotation 214 of the joint unit 212 of the fastening device 200 thus run oppositely to one another.

Figure 2A:
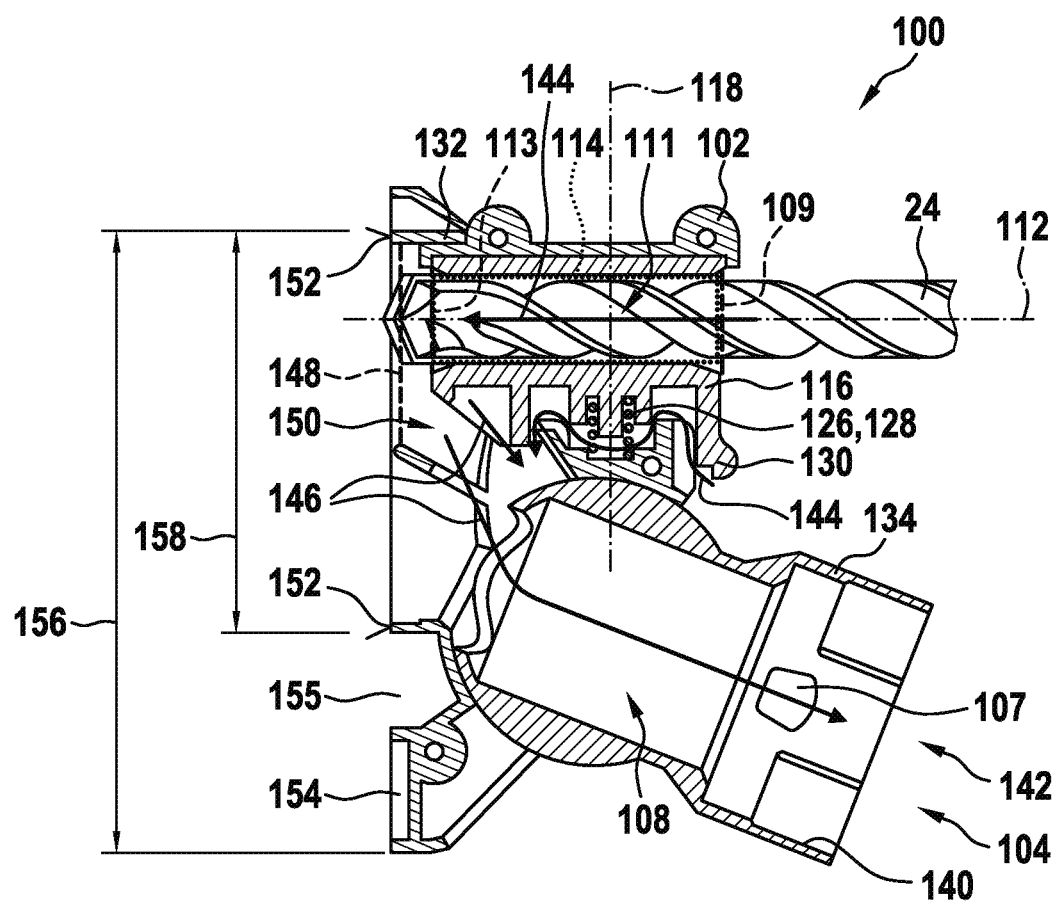

FIG. 2a shows a longitudinal section through the suction-extraction aid 100 as per FIG. 1a with an inserted application tool 24. The application tool 24 is received in the receptacle 111. The application tool 24 has been received via the first opening 109 and furthermore also extends through the second opening 113 of the receptacle 111. Spanned between the first opening 109 and the second opening 113 is a receiving region 114, which is adaptable in terms of its size. For this purpose, the receptacle 111 has a receiving element 116 which is arranged movably in the housing 102 of the suction-extraction aid 100. The receiving element 116 is composed, for example, of a plastic. The receiving element 116 is in particular configured so as to be linearly movable along an axis 118 which extends substantially perpendicular to the receiving axis 112 of the receptacle 111. The housing 102 of the suction-extraction aid 100 has two mutually oppositely situated guide grooves 120, into which corresponding guide pegs 122 (see FIG. 2b) of the receiving element 116 engage.

The receiving element 116 is acted on with a force along the axis 118 in the direction of the application tool 24 by means of a spring element 126. It is advantageously thus the case that the suction-extraction aid 100 is seated substantially without play on the application tool 24, whereby tilting of the suction-extraction aid 100 relative to the application tool 24 can be prevented. The spring element 126 is configured for example as a spiral spring 128 that is arranged between the housing 102 and the receiving element 116.

In particular, the receiving element 116 is acted on with a force such that the receiving region 114 is at its smallest when no application tool 24 is inserted. In particular, when no application tool 24 is inserted, the receiving region 114 is, in terms of diameter, smaller than a diameter of the application tool 24 that is to be inserted. In order to facilitate the receiving of the application tool 24, the receptacle 111 has an actuating element 130. The actuating element 130 is for example formed as a single piece with the movable receiving element 116. The actuating element 130 projects entirely out of the housing 102 of the suction-extraction aid 100 and is preferably shaped such that, via the actuating element 130, a force counter to the spring force of the spring element 126 can be imparted manually by the user in order to enlarge the receiving region 114.

The housing 102 of the suction-extraction aid 100 comprises two housing half-shells 132 which are connected to one another by means of a screw connection. Alternatively, other types of configuration of the housing 102 are also conceivable. In particular, other types of connection, such as for example plugging together, are also conceivable. The receiving element 116 and a further interface housing part 134, which comprises the interface 104, are arranged in the housing half-shells 132.

Figure 2C:
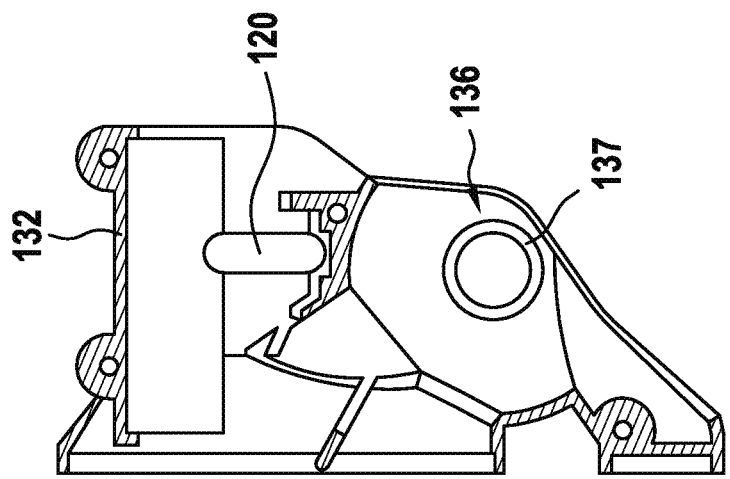
FIG. 2c shows a side view of the suction-extraction aid as per FIG. 2b without interface.
Figure 2B:
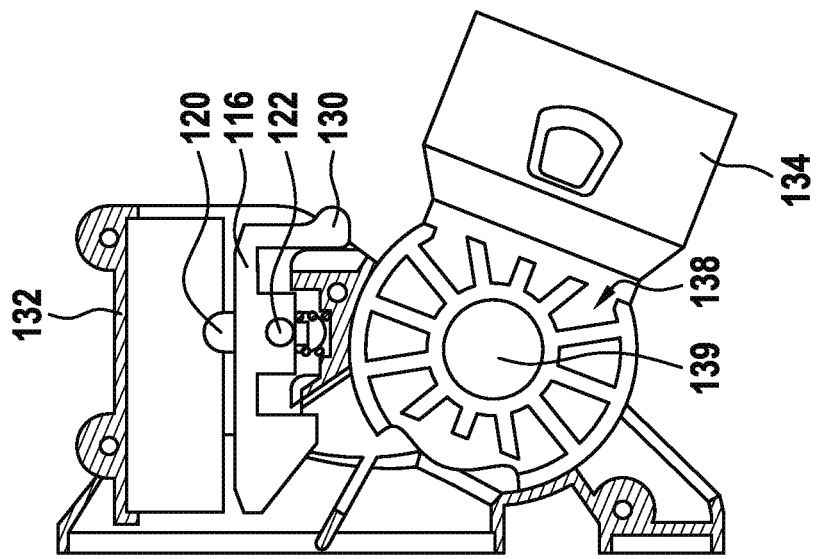
FIG. 2b shows a side view of the suction-extraction aid as per FIG. 1a with partially dismounted housing.

FIG. 2b shows a side view of one of the housing half-shells 132 with inserted receiving element 116 and inserted interface housing part 134. FIG. 2c illustrates a side view that shows only the housing half-shell 132. The joint unit 108 of the suction-extraction aid 100 is configured for example as a rotary joint. The joint unit 108 of the suction-extraction aid 100 comprises two joint elements 136, 138 which are configured to be movable relative to one another. The first joint element 136 is configured for example as two mutually opposite conical and hollow cylindrical pegs 137 which are formed as a single piece with the housing half-shells 132 and are arranged on the inner side thereof. The second joint elements 138 are formed as a single piece with the interface housing part 134 and are arranged on the outer side thereof. Correspondingly to the first joint elements 136 configured as pegs 137, the second joint element 138 is configured as two mutually opposite cylindrical receptacles 139. In the connected state, the interface housing part 134 is thus configured so as to be rotatable relative to the housing half-shells 132 about the axis of rotation 110.

The interface housing part 134 is configured partially as an inner housing and partially as an outer housing. Here, the region that is configured as an inner housing comprises the second joint element 138, and the region that forms the outer housing comprises the interface 104 for the connection to the suction hose 36 in a manner detachable without the use of tools. The interface 104 comprises two mutually opposite recesses 107 in the wall and a diameter enlargement 140 in the region of the opening 142, provided for the suction hose 36, of the suction-extraction aid 100.

The suction-extraction aid 100 has for example two first air channels 144 (see FIG. 2d) for the drawing-in of fresh air and for example a single second air channel 146 for the extraction of the drilling cuttings by suction.

One of the first air channels 144 is formed by the receptacle 111. The receptacle 111 is shaped such that, even when an application tool 24 has been inserted, said receptacle is not completely filled by the application tool 24, and thus an air stream can in particular laterally pass the application tool 24 in the receptacle 111.

The further first air channel 144 is arranged in a region between the housing 102, in particular the joint unit 108, and the receiving element 116. In particular, the further first air channel 144 is delimited by the receiving element 116. The size or the cross section of the further first air channel 144 is in particular configured so as to be variable. Different cross sections for the further first air channel 144 arise in a manner dependent on the position of the receiving element 116. It is advantageously thus possible for a larger further first air channel 144 to be provided in the case of smaller drilling tools.

The second air channel 146 extends substantially from a workpiece-side opening 148 of the suction-extraction aid 100 to the interface 104 of the suction-extraction aid 100. The housing 102 of the suction-extraction aid 100 forms, in the state in which it lies against the workpiece 30, a connecting region 150 that connects the two first air channels 144 and the second air channel 146 to one another. The connecting region 150 is delimited on one side by the workpiece-side opening 148. The workpiece-side opening 148 is surrounded by a contact surface 152. The contact surface 152 is formed by the face end of the housing 102 of the suction-extraction aid 100.

Spaced apart from the contact surface 152, the housing 102 of the suction-extraction aid 100 has a support element 154 which is configured to enlarge the region, spanned by the contact surface 152, which bears against the workpiece 30. A likelihood of tilting of the suction-extraction aid 100 on the workpiece 30 is thus advantageously further reduced. For example, between the contact surface 152 and the support element 154, a cavity 155 is formed in which the housing 102 does not lie against the workpiece 30. It is alternatively also conceivable for the housing 102 to lie against the workpiece throughout as far as the end of the support element 154. For example, the support element 154 is configured and arranged such that a maximum diameter 156 at which the suction-extraction aid 100 lies against the workpiece 30 is enlarged by more than 50% in relation to a maximum diameter 158 of the connecting region 150.

Also arranged in the connecting region 150 (see FIG. 2d) is an air-guiding element 160 which is configured to reduce the size of that region on the workpiece 30 which is exposed to dust-laden air. The air-guiding element 160 is arranged substantially centrally in the connecting region 150 and extends substantially as far as the workpiece-side opening 148 of the suction-extraction aid 100. The air-guiding element 160 may, as an additional support, also be configured so as to lie against the workpiece 30. The air-guiding element 160 is configured to be inclined toward the second air channel 146 or the interface 104 in order to conduct the dust emerging from the drilled hole into the second air channel 146. It is advantageously the case that, by means of the air-guiding element 160, the workpiece 30 is exposed to the dust not entirely but only partially, in this case only over approximately 60%, in the region of the workpiece-side opening 148.

Figure 2D:
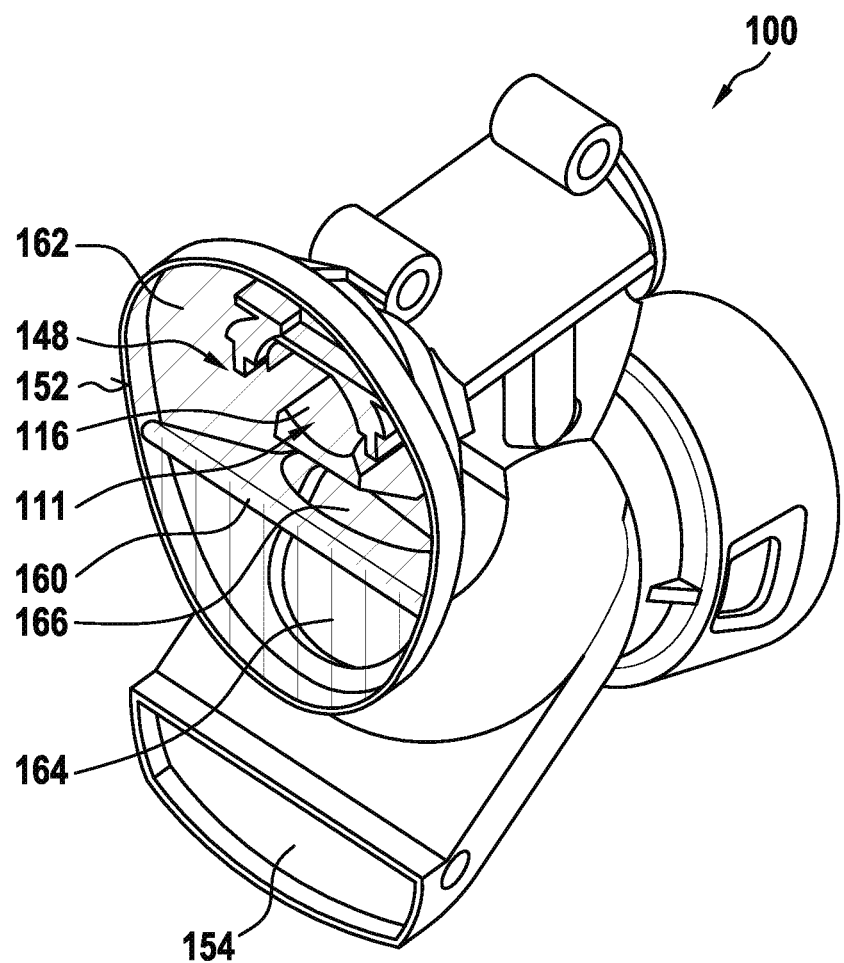

FIG. 2d illustrates the suction-extraction aid 100 in a perspective view. The air-guiding element 160 divides the region spanned by the contact surface 152 into two sections; an upper section 162, which surrounds the receiving axis 112 and in which the first air channels 144 and the second air channel 146 transition into one another, and a lower section 164, which is not intersected by the receiving axis 112. The two sections 164 are separated by the air-guiding element 160, but are connected to one another by a passage 166. The passage 166 of the air-guiding element 160 is arranged in the interior of the housing 102, and so as to be spaced apart from the tool-side opening 148 of the suction-extraction aid. In the case of such an arrangement of the air-guiding element 160, the workpiece comes into contact with dust-laden air substantially only in the upper section 162.

Figure 3B:
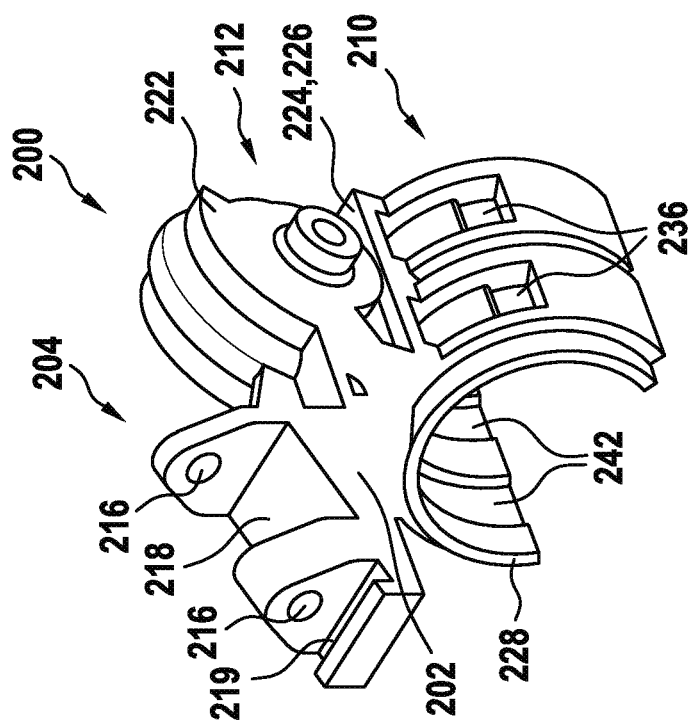
FIG. 3b shows a perspective view of the fastening device.
Figure 3A:
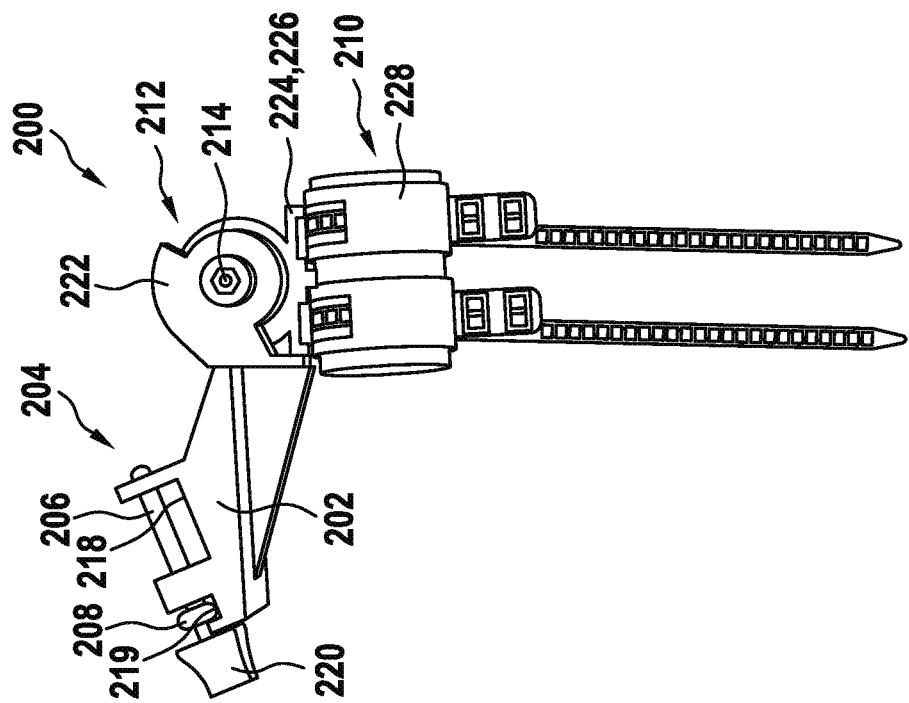

FIG. 3a shows a side view of the fastening device 200. FIG. 3b shows a perspective view of the fastening device 200 without the fastening means 206 of the first fastening interface 204.

In the region of the first fastening interface 204, the main body 202 has two passage openings 216 which are for example cylindrical and which are oriented coaxially with respect to one another. Between the passage openings 216, the main body 202, in particular the first fastening interface 204, has a first cutout 218, in which the additional handle 50 can be partially arranged (see FIG. 1a). Adjacent to the first cutout 218, the first fastening interface 204 has a second cutout 219 which is provided for the axial securing of the fastening means 206. The first cutout 218 and the second cutout 219 are separated from one another by means of one of the passage openings 216. The second cutout 219 is provided for receiving the securing element 208, which is configured for example as an annular diameter enlargement on the fastening means 206. In order to simplify the operability of the first fastening interface 204, the fastening means 206 on which the securing element 208 is arranged has an operating element 220. The operating element 220 is provided for being gripped by the user during the connection of the fastening device to, or the detachment of the fastening device from, the additional handle 50.

It would alternatively likewise be conceivable for the fastening means 206 to have, on its outer surface, a screw thread and a nut, wherein the fastening means 206 is clamped to the main body 202 by means of the nut.

The joint unit 212 of the second fastening interface 210 comprises a first joint element 222 and a second joint element 224, which together form a rotary joint, whereby the second fastening interface 210 is configured to be rotatable about the axis of rotation 214.

The first joint element 222 is formed by the main body 202 of the fastening device 200. The second joint element 224 is formed by an interface element 226 of the second fastening interface 210, which interface element, on one side, comprises the second joint element 224 and, on another side, has a first fastening element 228 which is configured for partially engaging around the suction hose 36 for the purposes of fastening. The second joint element 224 and the first fastening element 228 are thus connected rotationally conjointly to one another, and in particular are formed as a single piece with one another.

Figure 3C:
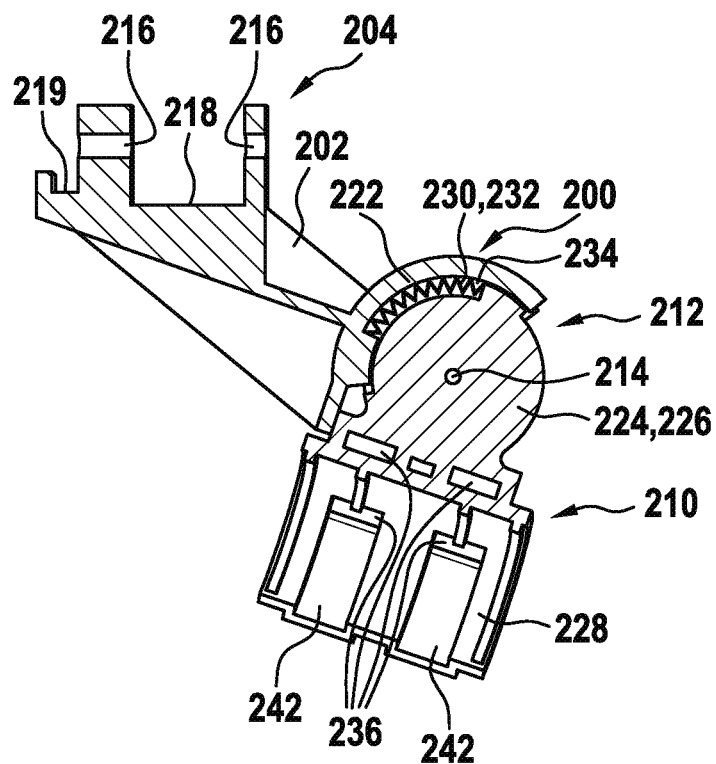
FIG. 3c shows a longitudinal section through the fastening device as per FIG. 3b.

FIG. 3c shows a longitudinal section of the fastening device 200. The fastening device 200 has a resetting element 230 which is configured to act on the second joint element 224 with a resetting force. The resetting element 230 is configured for example as a spiral spring 232 and is arranged in a spring element receptacle 234 that is arranged between the first and the second joint element 222, 224. In particular, the resetting element 230 is arranged such that it lies, on one side, against the first joint element 222 and, on an opposite, second side, against the second joint element 224. The second joint element 224 is preferably acted on with a force such that the first fastening element 228 is moved in the direction of the first fastening interface 204 and/or in the direction of the suction-extraction aid 100.

Figure 3D:
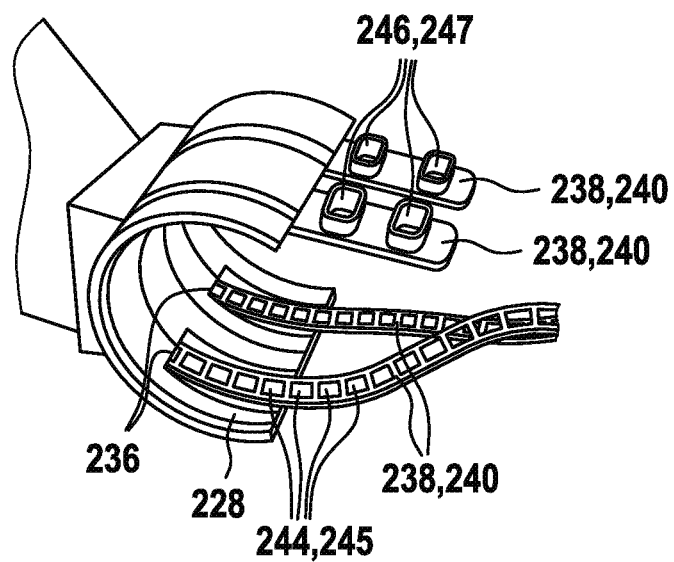

FIG. 3d shows a perspective view of the second fastening interface 210. The first fastening element 228 of the second fastening interface 210 is of substantially C-shaped form. The first fastening element 228 is in particular configured so as to engage around the suction hose 36 by more than 180° in a circumferential direction. It is advantageously thus possible for the suction hose 36 to be held in positively locking fashion. Furthermore, the first fastening element 228 has fastening element receptacles 236 which are configured to receive a second fastening element 238. The second fastening element 238 is configured to be movable relative to the first fastening element 228. For example, the fastening device 200 has two second fastening elements 238, which are configured as cable tie elements 240. For example, the first fastening element 228 has, for each cable tie element 240, two fastening element receptacles 236 which are configured for guiding the cable tie elements 240. In the state in which it is connected to the first fastening element 228, the second fastening element 238 is arranged partially within the interface element 226. In order to improve the guidance, the first fastening element 228 has, on its inner surface, guide tracks 242 for the second fastening element 238 or the cable tie element 240. It is alternatively or additionally likewise conceivable for the outer surface of the first fastening element 228 to have guide tracks for the second fastening element 238.

The cable tie elements 240 are formed from a flexible and bendable material, in particular an elastic plastic, and are shown in FIG. 3d in a perspective view in the state in which they are connected to the first fastening element 228. The cable tie elements 240 have two mutually corresponding positive-locking elements 244, 246 by means of which the cable tie elements 240 are configured to be connectable to themselves in non-positively and/or positively locking fashion.

The first positive-locking elements 244 are configured for example as substantially rectangular recesses 245. The cable tie elements 240 each have a multiplicity of first positive-locking elements 244, which are arranged in a row and so as to be equally spaced apart. The second positive-locking elements 246 are configured as elevations 247 such that, in the connected state, they engage into in each case one first positive-locking element 244 or into one recess 245. The cable tie elements 240 have, for example, in each case two second positive-locking elements 246. The first positive-locking elements 244 and the second positive-locking elements 246 are arranged on mutually opposite ends of the cable tie elements 240.

The cable tie elements 240 are of elastic configuration such that the cable tie elements 240 can be lengthened by the user in terms of their length by a distance which corresponds in particular to one half of a spacing of the first positive-locking elements 244 to one another, preferably to a spacing of the first positive-locking elements 244 to one another, preferably to twice a spacing of the first positive-locking elements 244 to one another.

It is furthermore conceivable for the handheld power tool 10 to be connected not only to the suction-extraction aid 100 and the fastening device 200 but also to a further cable tie element 250 (see FIGS. 1a and 1b) on the handle 48 of the handheld power tool 10 in order to further improve the ergonomics of the overall system.

Figure 4B:
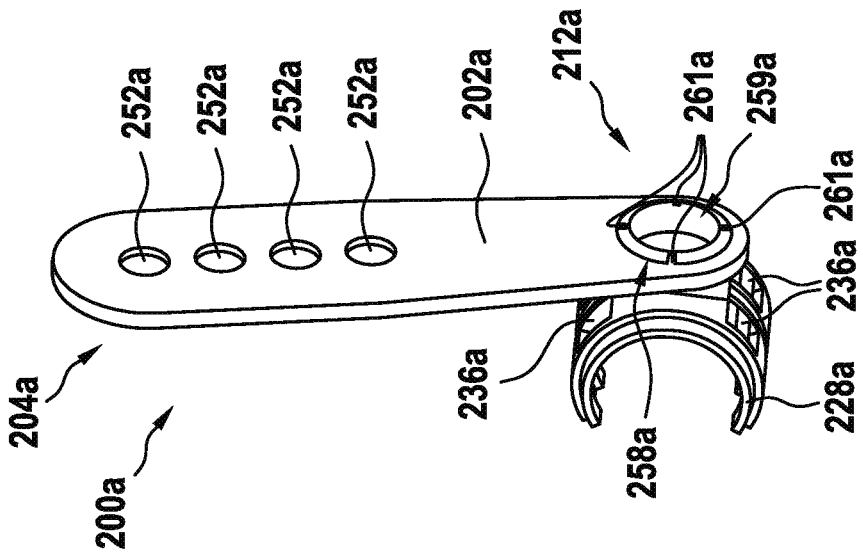
Figure 4A:
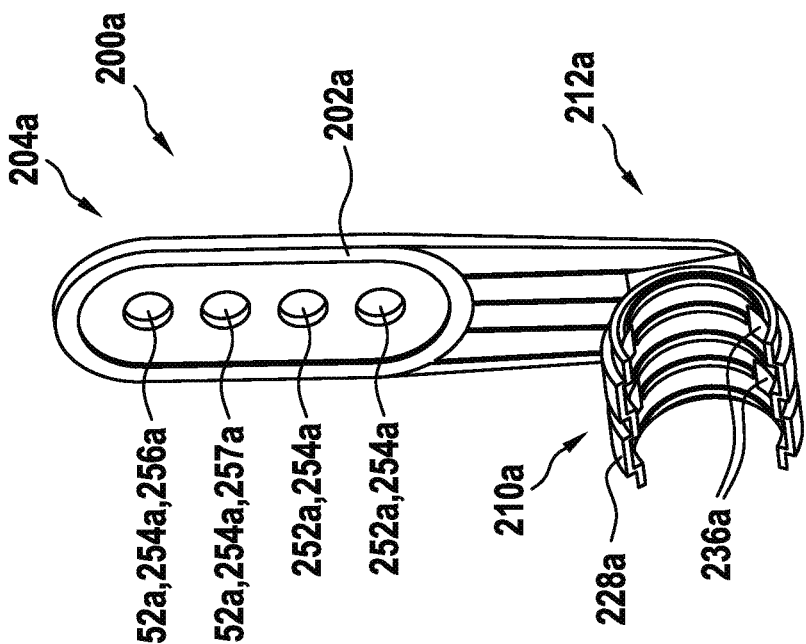
FIG. 4a shows a perspective view of an alternative embodiment of a fastening device.

FIG. 4a shows a further embodiment of the fastening device 200a in a perspective view. The fastening device 200a has a main body 202a. Furthermore, the fastening device 200a comprises a first fastening interface 204a and a second fastening interface 210a.

The first fastening interface 204a comprises, for example, four positioning elements 252a which are configured for the non-positively and/or positively locking connection of the fastening device 200a to the handheld power tool 10 or the additional handle 50. The positioning elements 252a each have a different spacing to the second fastening interface 204a. The positioning elements 252a are arranged for example in a straight row and are formed for example as cylindrical cutouts 254a in the main body 202a of the fastening device 200a. The first positioning element 256a has the greatest spacing to the second fastening interface 210a. In particular, the spacing of the first positioning element 256a to the second fastening interface 210a is greater than the spacing of the second positioning element 257a to the second fastening interface 210a.

The additional handle 50 has a screw connection (not illustrated) which detachably connects a handle region 51 (see FIG. 1a) of the additional handle 50 to a connection region (not illustrated) of the additional handle 50. The connection region of the additional handle 50 surrounds the handheld power tool 10, in particular the tool receptacle 22, for the connection thereto. Such additional handle are widely used and are known to a person skilled in the art. The handle region 51 is configured to be detachable from the connection region by way of a rotation of the handle region 51. In the detached state, the screw connection (not illustrated) is guided through one of the positioning elements 252a and, subsequently, by means of a rotation, the handle region 51 and the connection region are connected such that the fastening device 200a is arranged between said regions. The spacing of the second fastening device 200a to the handheld power tool 10 can be defined through the selection of the positioning elements 252a.

Adjustable positioning relative to the handheld power tool 10 is expedient in particular if the coupling interface 44a of the suction hose 36a is not configured to be compatible with the interface 104 of the suction-extraction aid 100, as shown for example in FIG. 4e. In this case, an adapter 60a is necessary, which, at one end, has a suction-extraction aid interface 62a, which corresponds to the interface 104 of the suction-extraction aid 100, and a suction hose interface 64a, which corresponds to the coupling interface 44a of the suction hose 36a. By means of the adapter 60a, the end of the suction hose 36a is shifted by substantially the length of the adapter 60a in the direction of the fastening device 200a, whereby the mobility of the suction hose 36a can be impaired. The length of the adapter 60a can advantageously be compensated through the selection of a corresponding positioning element 252a.

The second fastening interface 210a has a first fastening element 228a which substantially corresponds to the above-described first fastening element 228. Accordingly, the first fastening element 228a has multiple fastening element receptacles 236a for the connection and guidance of second fastening elements 238 (not illustrated) which, as before, may be configured as cable tie elements 240.

The first fastening element 228a is connected to the main body 202a in a manner detachable without the use of tools. The connection is realized by means of detent engagement, wherein the first fastening element 228a has a detent element 258a. The main body 202a of the fastening device 200a has a positive-locking element 259a which corresponds to the detent element 258a and which is configured for example as a cylindrical cutout (see FIG. 4c).

Figure 4D:
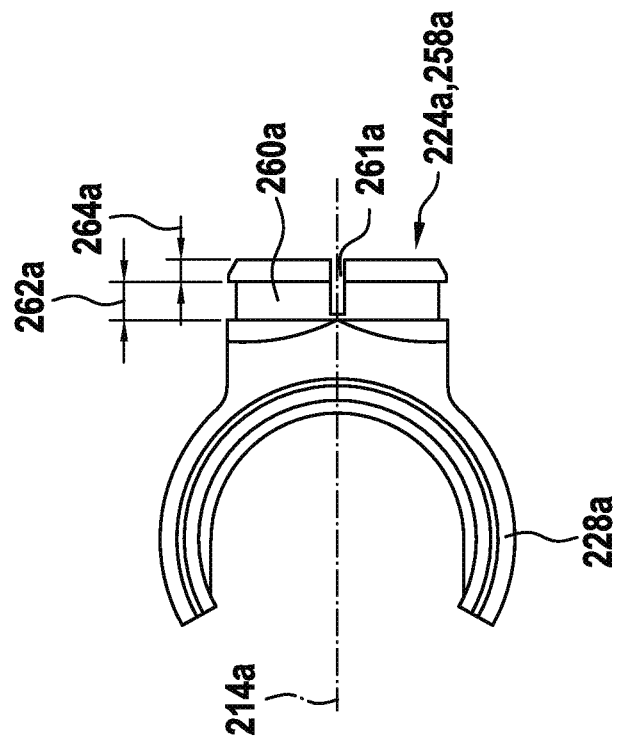
Figure 4C:
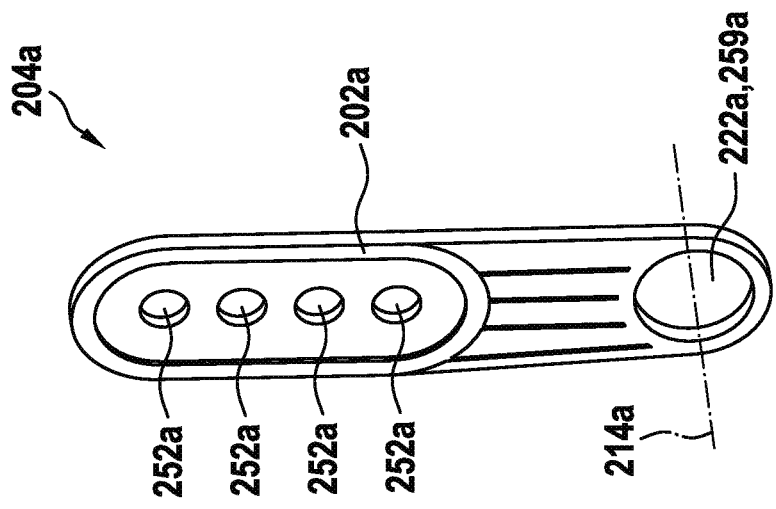

The first fastening element 228a is shown in FIG. 4d in a side view. The detent element 258a is configured for example as a substantially hollow cylindrical detent element 258a. A hollow cylindrical wall 260a of the detent element 258a has two regions 262a, 264a with different diameters. The diameter is configured to be smaller in the first region 262a than in the second region 264a. Furthermore, the diameter in the first region 262a is configured to be substantially constant. The first region 262a is configured for receiving the main body 202c, such that the main body 202c, in the connected state, lies movably against the first fastening element 228a. The detent element 258a and the cutout 259a of the main body 202a advantageously form a rotary joint for the movable connection of the second fastening interface 210a about an axis of rotation 214a. Thus, the cutout 259a of the main body 202a corresponds to the first joint element 222a, and the detent element 258a corresponds to the second joint element 224a, of the joint unit 212a of the fastening device 200a.

The second region 264a of the detent element 258a has an outer diameter which runs, for example, conically. The second region 264a is, in the state in which it is connected to the main body 202a, configured for forming an undercut.

The detent element 258a is of at least partially elastic configuration. For example, the wall 260a has four slots 261a, by means of which the detent elements 258a is divided into four elastic segments. The slots 261a are spaced apart from one another by in each case 90° along the circumferential direction, such that the segments are, for example, of the same size. The detent element 258a is of elastic configuration such that, during the process of connection to the main body 202a, the outer diameter of the detent element 258a can be reduced to a value less than the diameter of the cutout 259a of the main body 202a. As can be seen in FIG. 4b, the fastening element 228a engages behind the main body 202a in the connected state.

Figure 5:
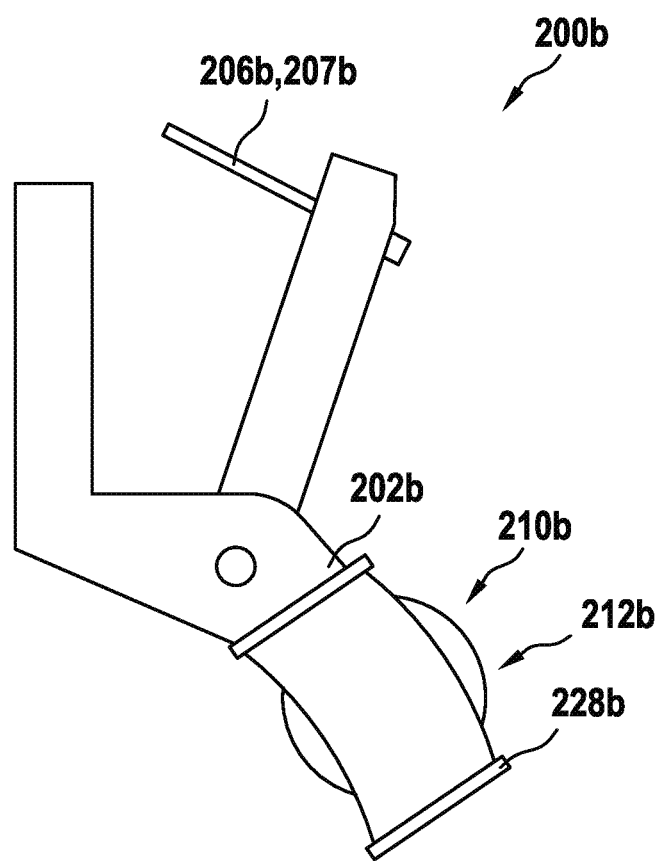
FIG. 5 shows a side view of a further alternative embodiment of a fastening device.

FIG. 5 shows a further alternative embodiment of the fastening device 200b in a side view. The second fastening interface 210b corresponds here substantially to the second fastening interface 210a of the preceding embodiment. The second fastening interface 210b thus comprises a joint unit 210b by means of which the first fastening element 228b for the suction hose is connectable rotatably to the main body 202b of the fastening device 200b.

The first fastening interface 204b of the fastening device 200b comprises a fastening means 206b which is rotatably connected to the main body 202b. The fastening means 206b is configured for example as a screw element 207b. The fastening means 206b is provided for connection to the additional handle 50 by means of the depth stop receptacle. The fastening means 206b has a screw thread by which the fastening means 206b is connectable to a corresponding counterpart thread (not illustrated) in the main body 202b.

Figure 6:
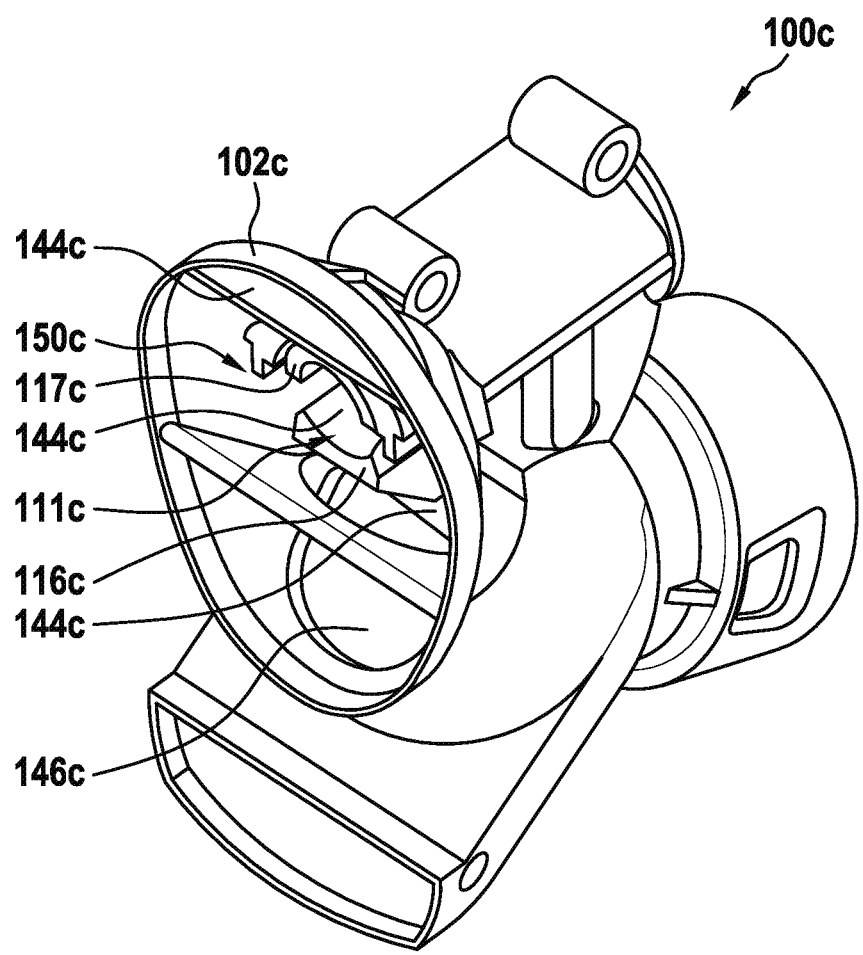
FIG. 6 shows a perspective view of an alternative embodiment of a suction-extraction aid.

FIG. 6 shows an alternative embodiment of the suction-extraction aid 100 as per FIG. 2d in a perspective view. The suction-extraction aid 100c differs in particular by an additional first air channel 144c for the drawing-in of air into the connecting region 150c and by an additional mounting element 117c in the receptacle 111c for receiving the application tool 24.

The additional first air channel 144c is arranged in the housing 102c of the suction-extraction aid 100c above the receptacle 111c. In this way, the suction-extraction aid 100c has a total of three first air channels 144c which, at least in certain regions, run separately from one another and, in the connecting region 150c, transition into one another and open into the second air channel 146c.

The additional mounting element 117c is formed from a different material than the housing 102c of the suction-extraction aid. In particular, the additional mounting element 117c is composed of a more wear-resistant material than the housing 102 of the suction-extraction aid. The additional mounting element 117c may be formed from a plastic or a metal, for example steel. The additional mounting element 117c is for example connected cohesively to the housing 102c by means of an adhesive connection. It would however likewise be conceivable for the additional mounting element 117c to be connected to the housing 102c by means of a non-positively and/or positively locking connection. The additional mounting element 117c extends substantially along the entire receptacle 111c and has a non-closed circular ring as a cross section. The receiving region 114c is thus limited substantially by the movable receiving element 116c and the additional mounting element 117c.

Figure 7:
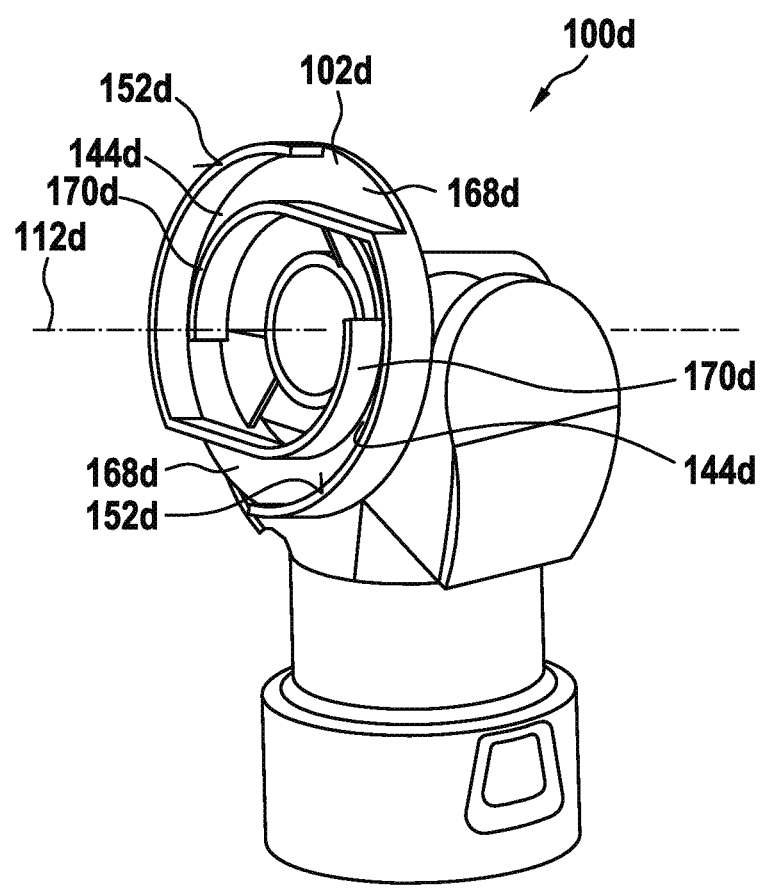
FIG. 7 shows a perspective view of a further alternative embodiment of a suction-extraction aid.

FIG. 7 shows a further alternative embodiment of the suction-extraction aid 100d in a perspective view. The suction-extraction aid 100d has, in particular, two first air channels 144d which are configured for the drawing-in of air, wherein the air inlet openings 168d of the first air channels 144d are arranged in the region of the workpiece-side opening 148d.

The first air channels 144c are delimited laterally by the contact surface 152d and by air-guiding elements 170d. The air-guiding elements 170d are configured for lengthening the distance that the air stream covers from the air inlet openings 168d to the second air channel 146d. In particular, the air-guiding element 170d is configured to conduct the air stream in a curved manner, preferably on a circular path as illustrated for example, about the receiving axis 112d.

It can advantageously thus be ensured that not the entire region that is spanned by the contact surface 152d comes into contact with dust-laden air. In a view directed onto the receiving axis 112d, it is advantageously the case that only substantially that region which is spanned by the air-guiding elements 170d is exposed to the dust-laden air.

Figure 8A:
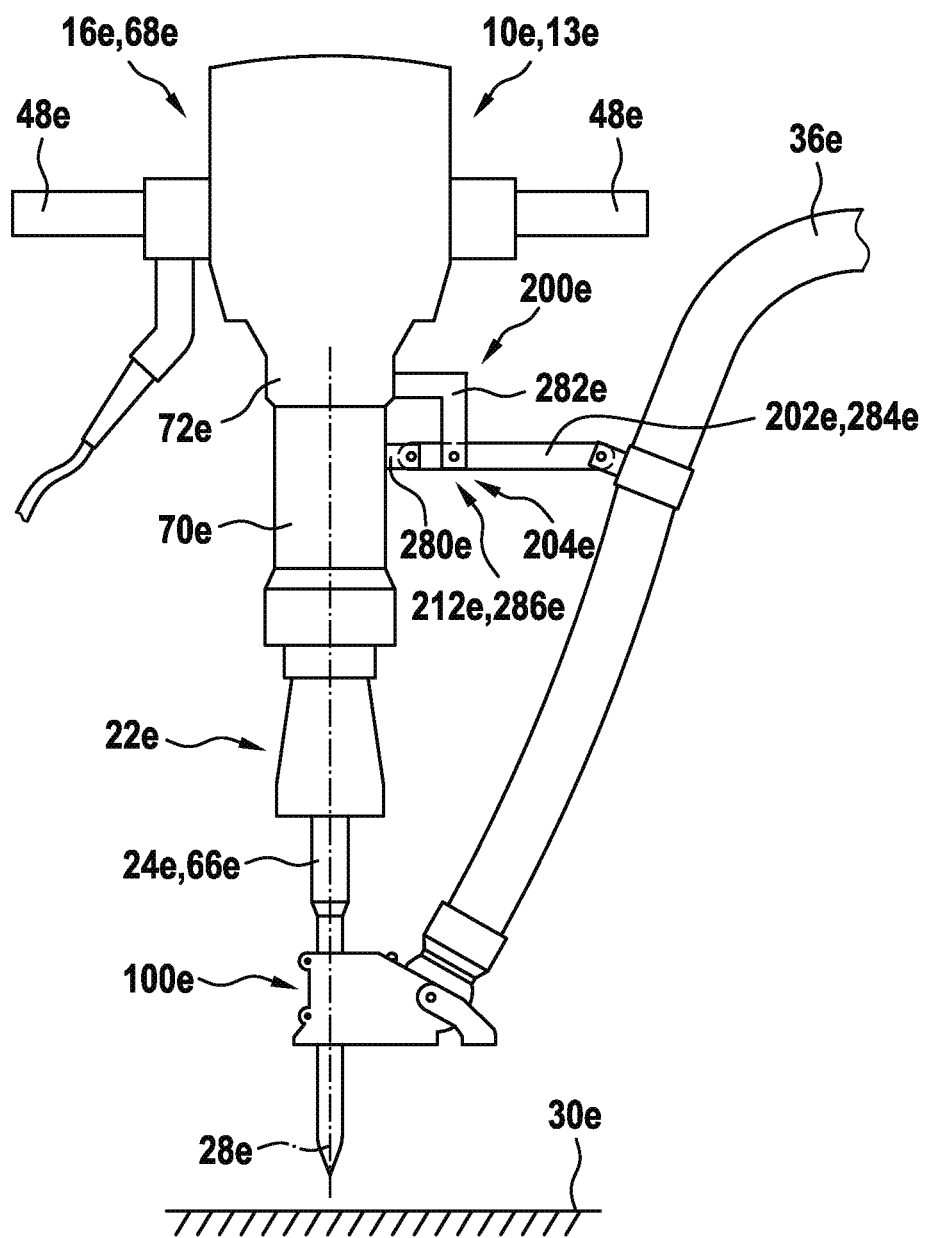
FIG. 8a shows a side view of a demolition hammer having a fastening device and having a suction-extraction aid, upon the application of the demolition hammer.
Figure 8B:
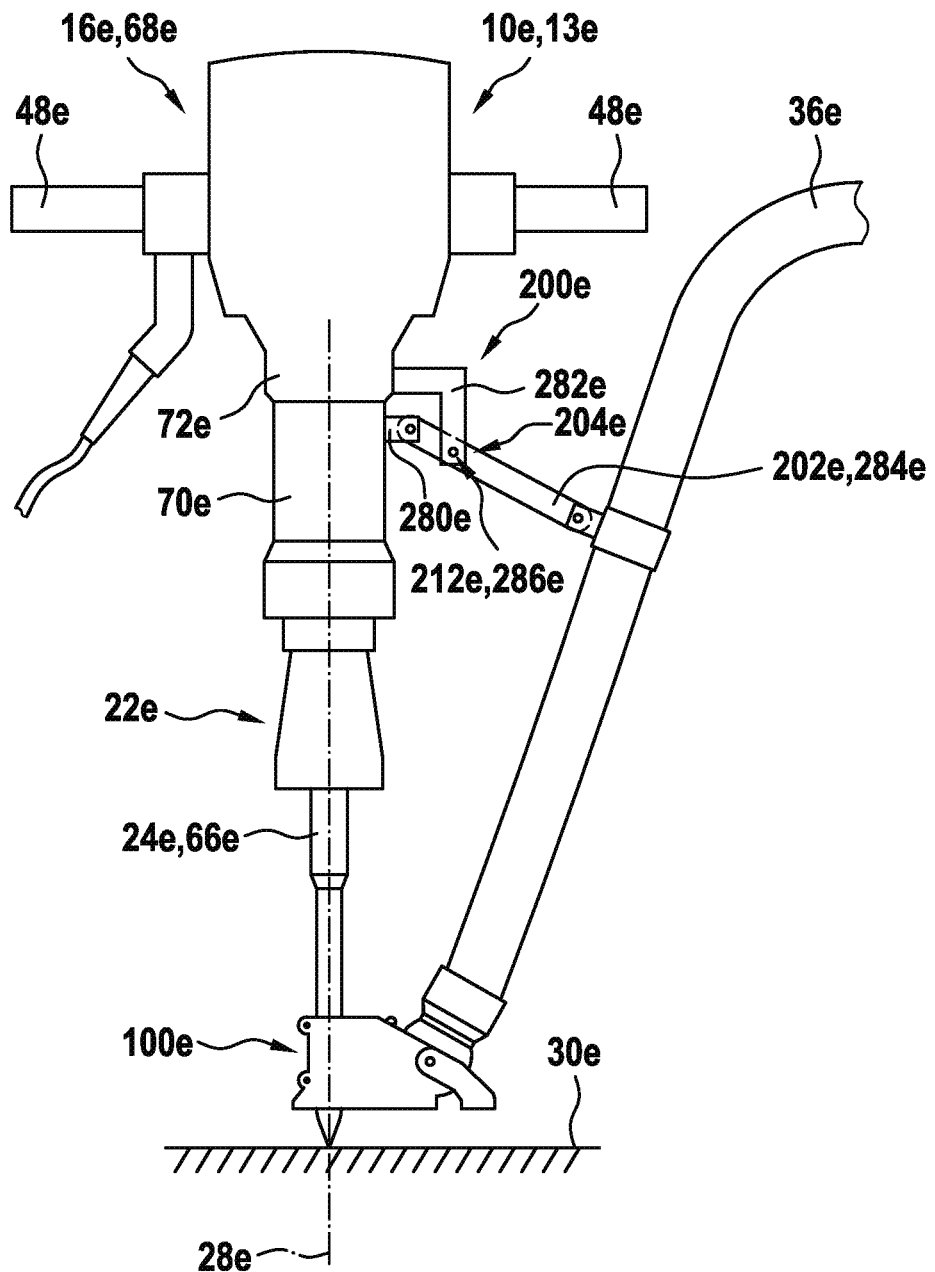
FIG. 8b shows a side view of a demolition hammer having a fastening device and having a suction-extraction aid, during the working process.

FIG. 8a and FIG. 8b show a further embodiment of the fastening device 200e in a schematic side view. The fastening device 200e is fastened to a handheld power tool 10e configured as a demolition hammer 13e.

The demolition hammer 13e is provided for heavy demolition work and has a percussive mechanism for driving an application tool 24e in linearly oscillating fashion along the working axis 28e. The application tool 24e is detachably received in the tool receptacle 22e. The demolition hammer has such a high weight that, during operation, it is not held but merely guided. For this purpose, the demolition hammer 13e has two handles 48e which extend to perpendicularly with respect to the working axis 28e. The application tool 24e is, for example, a chisel 66e.

In order that the intense vibrations of the demolition hammer 13e during operation are transmitted only in damped fashion to the user, the housing 16e of the handheld power tool 10e is configured as a decoupled housing 68e. The decoupled housing 68e comprises two outer housing parts 70e, 72e that are connected to one another in a manner decoupled from one another by means of a vibration damping unit (not illustrated). As a result of the decoupling, the two outer housing parts 70e, 72e move relative to one another upon application to a workpiece or in the event of vibrations. The tool receptacle 22e is, for example, connected substantially immovably to the first outer housing part 70e. In FIG. 8a, the handheld power tool 10e has merely been applied by way of the application tool 24e to the workpiece 30e, that is to say no additional pressure is being exerted along the working axis 28e by the user. FIG. 8b shows the handheld power tool 10e during the chiseling process, wherein, as a result of the pressure exerted by the user along the working axis 28e, the second outer housing part 72e has been displaced in the direction of the first outer housing part 70e, in particular in the direction of the tool receptacle 22e. Thus, as a result of the action of force on the handles 48e, in particular on the second outer housing part 72e, the spacing between the first and the second outer housing part 70e, 72e, in particular the spacing between the second outer housing part 72e and the tool receptacle 22e, is reduced.

The chisel 66e is connected to a suction-extraction aid 100e, which corresponds substantially to the suction-extraction aid 100 as per FIG. 1a. The suction-extraction aid 100e is connected by means of a suction hose 36e to a suction-extraction device (not illustrated). For improved guidance of the suction hose 36, this is additionally fastened by means of the fastening device 200e to the decoupled housing 68e of the handheld power tool 10e.

The fastening device 200e has a first fastening interface 204e for the fastening of the fastening device 200e to the decoupled housing 68e of the handheld power tool 10e and has a second fastening interface 210e for the detachable fastening of the suction hose 36e to the fastening device 200e. The second fastening interface 210e may for example be configured analogously to the second fastening interface 210a as per FIG. 4a.

The first fastening interface 204e has two fastening means 280e, 282e, which are connected in each case detachably or fixedly to the decoupled housing 68e of the handheld power tool 10. In particular, the first fastening means 280e is connected to the first outer housing part 70e and the second fastening means 282e is connected to the second outer housing part 72e, such that the two fastening means 280e, 282e are moved toward one another upon application to a workpiece.

The two fastening means 280e, 282 are connected to one another by means of a boosting unit 286e. The boosting unit 286 is configured for example as a joint unit 212e. In particular, the two fastening means 280e, 282e are connected to one another by means of a main body 202e, which is configured for example as a lever fork 284e. The joint unit 212e is configured for example as a pin joint.

The second fastening interface 210e is advantageously connected by means of the lever fork 284e to the decoupled housing 68e such that a relative movement of the outer housing parts 70e, 72e is converted by a factor of at least 2, in particular at least 4, preferably at least 6, into the position of the second fastening interface 210e. For example, a relative movement of the outer housing parts 70e, 72e by 20 mm with respect to one another is converted into a relative movement of the second fastening interface 210e by 80 mm. In particular, in the event of a movement of the first outer housing part 70e in the direction of the second outer housing part 72e, the second fastening interface 210e is moved in the direction of the suction-extraction aid 100 to an increased extent. It is advantageously thus possible for a better view of the application tool 24 in the unloaded state to be realized. The spacing between the suction-extraction aid 100e and the fastening device 200e is configured to be substantially constant, and is thus configured so as to be substantially independent of the relative movement of the outer housing parts 70e, 72e.

Figure 9:
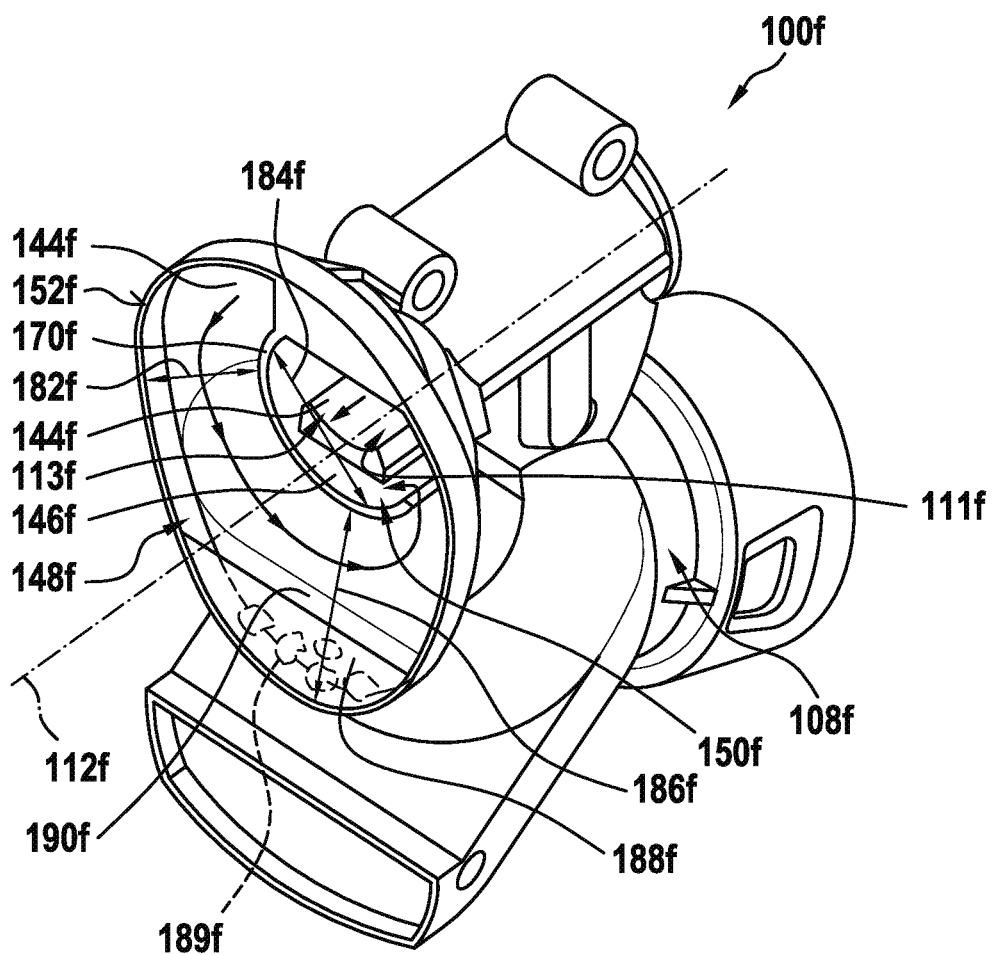
FIG. 9 shows a perspective view of an additional alternative embodiment of a suction-extraction aid.

FIG. 9 shows a further alternative embodiment of the suction-extraction aid 100f in a perspective view. The suction-extraction aid 100d has, in particular, two first air channels 144f which are configured for the drawing-in of air. One of the first air channels 144f is in this case formed, as described above, by the receptacle 108f. A further first air channel 144f has an air inlet opening (not illustrated) which is arranged on a side of the suction-extraction aid 100f which is averted from the workpiece-side opening 148f. It would also be conceivable to omit the first air channel 144f that is formed by the receptacle 111f.

The further first air channel 144f is delimited laterally by the contact surface 152f and by a single air-guiding element 170f. The workpiece-side opening 148f is completely surrounded by the contact surface 152f, such that no air can enter between the workpiece and the suction-extraction device 100f. The air-guiding element 170f surrounds the second opening 113f of the receptacle 111f over an angle range of at least 90°, preferably at least 180°, preferably and for example at least 270°, about the receiving axis 112f. In particular, the connecting region 150f, in which the first air channels 144f and the second air channel 146f transition into one another, is delimited on two opposite sides by the air-guiding element 170f. The air-guiding element 170f begins substantially at the same height as the contact surface 152f.

The air-guiding element 170f is configured to lengthen the distance that the air stream covers from the air inlet openings to the second air channel 146f. In particular, the air-guiding element 170d is configured to guide the air stream in a curved manner, preferably on a circular path as illustrated for example, about the receiving axis 112f to the connecting region 150f. In order to ensure a sufficiently large air stream, a minimum spacing 182f from the contact surface 152f to the air-guiding element 170f is at least half as great as a diameter 184f of the connecting region 150f. A maximum diameter 186f from the contact surface 152f to the air-guiding element 170f is greater, for example more than twice as great, as the diameter of the connecting region 150f.

Furthermore, the suction-extraction device 100f has, in the region of the tool-side opening 148f, a receiving pocket 188f which is provided for receiving relatively large pieces of rock 189f which cannot be extracted by suction owing to their size. The receiving pocket 188f has an opening 190f which is directed upward or in the direction of the connecting region 150f.

What is claimed is:

1. A fastening device for a suction hose, comprising:
a main body;
a first fastening interface having a first fastening structure that is substantially cylindrical and configured to detachably fasten to an auxiliary handle of a handheld power tool so as to detachably fasten the main body to the auxiliary handle;
a second fastening interface configured to detachably fasten the suction hose to the fastening device, the second fastening interface configured to receive an intermediate portion of the suction hose that is between a first end region and a second end region of the suction hose; and
a joint unit that pivotally connects the first fastening interface to the second fastening interface such that when the auxiliary handle is fastened to the main body and the suction hose is fastened to the second fastening interface, the suction hose is pivotable relative to the auxiliary handle about the joint unit,
wherein the joint unit is spaced apart from the first fastening structure,
wherein the first fastening interface defines two passage openings through which the first fastening structure extends,
wherein the first fastening interface defines a first cutout between the two passage openings and through which the first fastening structure passes and in which the auxiliary handle is partially arranged when the auxiliary handle is fastened to the first fastening structure,
wherein the first fastening interface further comprises an operating element via which the first fastening structure is rotated relative to the two passage openings, and
wherein the first fastening interface defines a second cutout in which an annular diameter enlargement of the first fastening structure is arranged so as to axially secure the first fastening structure relative to the main body.

2. The fastening device according to claim 1, wherein the joint unit includes a resetting element.

3. The fastening device according to claim 1, wherein the second fastening interface has at least one first fastening element configured to, in a fastened state, lie against the intermediate portion of the suction hose so as to partially engage around the suction hose.

4. The fastening device according to claim 3, wherein the second fastening interface has at least one second fastening element that is movable relative to the at least one first fastening element.

5. The fastening device according to claim 1, wherein the second fastening interface is at least partially detachable from the main body.

6. The fastening device according to claim 1, wherein the second fastening interface has at least one cable tie element.

7. The fastening device according to claim 1, wherein the second fastening interface includes at least one first fastening element configured as a partial cylinder defining a circumferential opening via which the intermediate portion of the suction hose is inserted into the partial cylinder.

8. A system comprising:
the fastening device according to claim 1; and
a suction-extraction aid comprising:
a suction hose receptacle configured to connect to the suction hose;
a housing defining a receptacle configured for receiving an application tool of the handheld power tool; and
a further joint unit configured to movably connect the suction hose receptacle to the housing.

9. The system according to claim 8, wherein the further joint unit includes a further joint axis that is parallel to a joint axis of the joint unit about which the first fastening interface and the second fastening interface pivot relative to one another.

10. The system according to claim 8, further comprising:
a further fastening device configured to connect the suction hose to a main handle of the handheld power tool.

11. The system according to claim 8, wherein:
the joint unit of the fastening device comprises a resetting element configured such that, in a state in which the suction-extraction aid is connected to the fastening device via the suction hose, the resetting element acts on the joint unit with a force directed away from the suction-extraction aid.

12. A system comprising:

a fastening device comprising:
- a main body;
- a first fastening interface configured to detachably fasten the main body to an auxiliary handle of a handheld power tool;
- a second fastening interface configured to detachably fasten the suction hose to the fastening device; and
- a joint unit that pivotally connects the first fastening interface to the second fastening interface such that when the auxiliary handle is fastened to the main body and the suction hose is fastened to the second fastening interface, the suction hose is pivotable relative to the auxiliary handle about the joint unit; and a suction-extraction aid comprising:
- a suction hose receptacle configured to connect to the suction hose;
- a housing defining a receptacle configured for receiving an application tool of the handheld power tool; and
- a further joint unit configured to movably connect the suction hose receptacle to the housing, wherein the joint unit of the fastening device comprises a resetting element configured such that, in a state in which the suction-extraction aid is connected to the fastening device via the suction hose, the resetting element acts on the joint unit with a force directed away from the suction-extraction aid.

* * * * *